Feb. 20, 1945.   G. W. McKEE   2,369,904
LATHE
Filed April 26, 1943   6 Sheets-Sheet 3
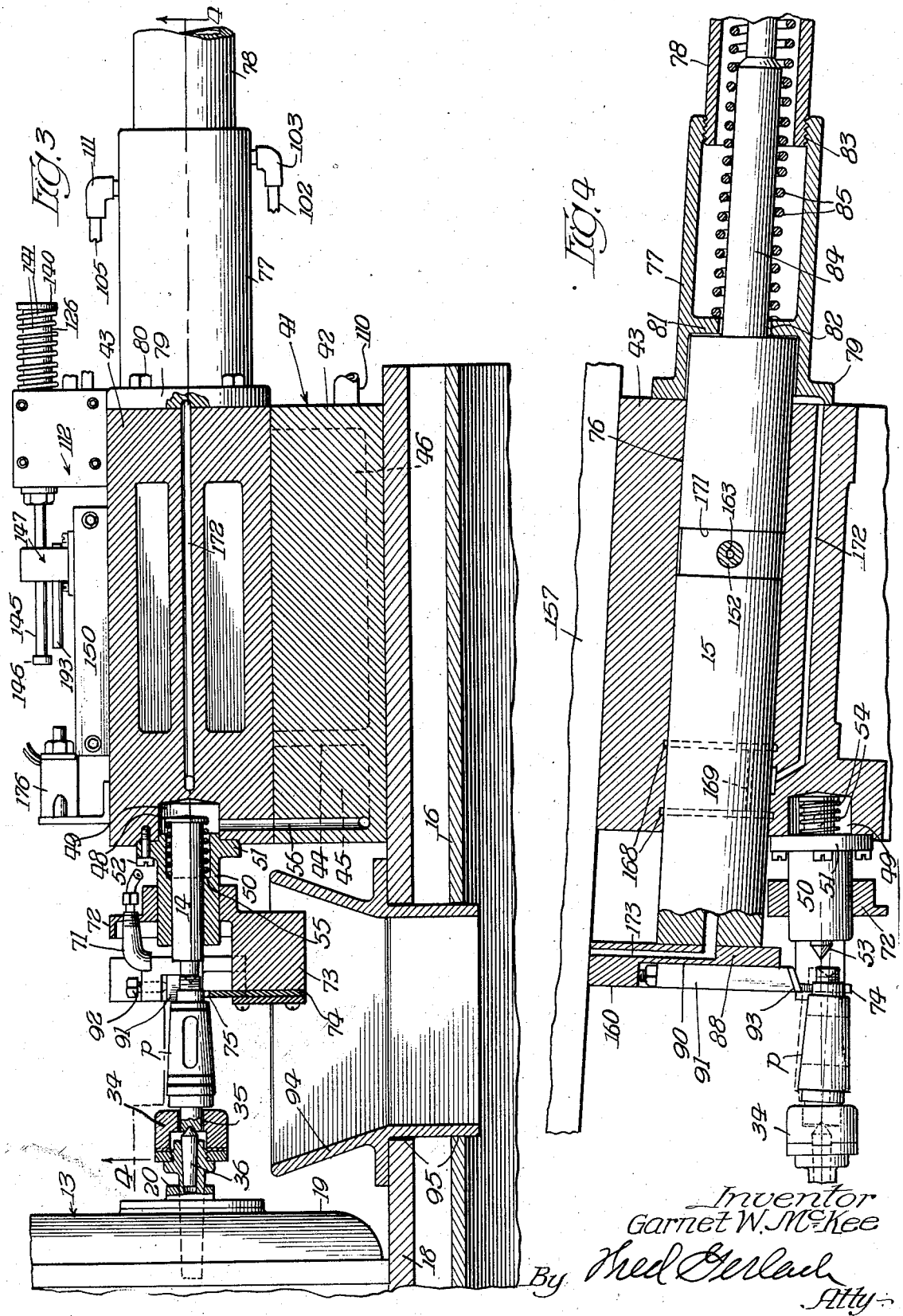
Inventor
Garnet W. McKee
By Fred Gerlach
Atty.

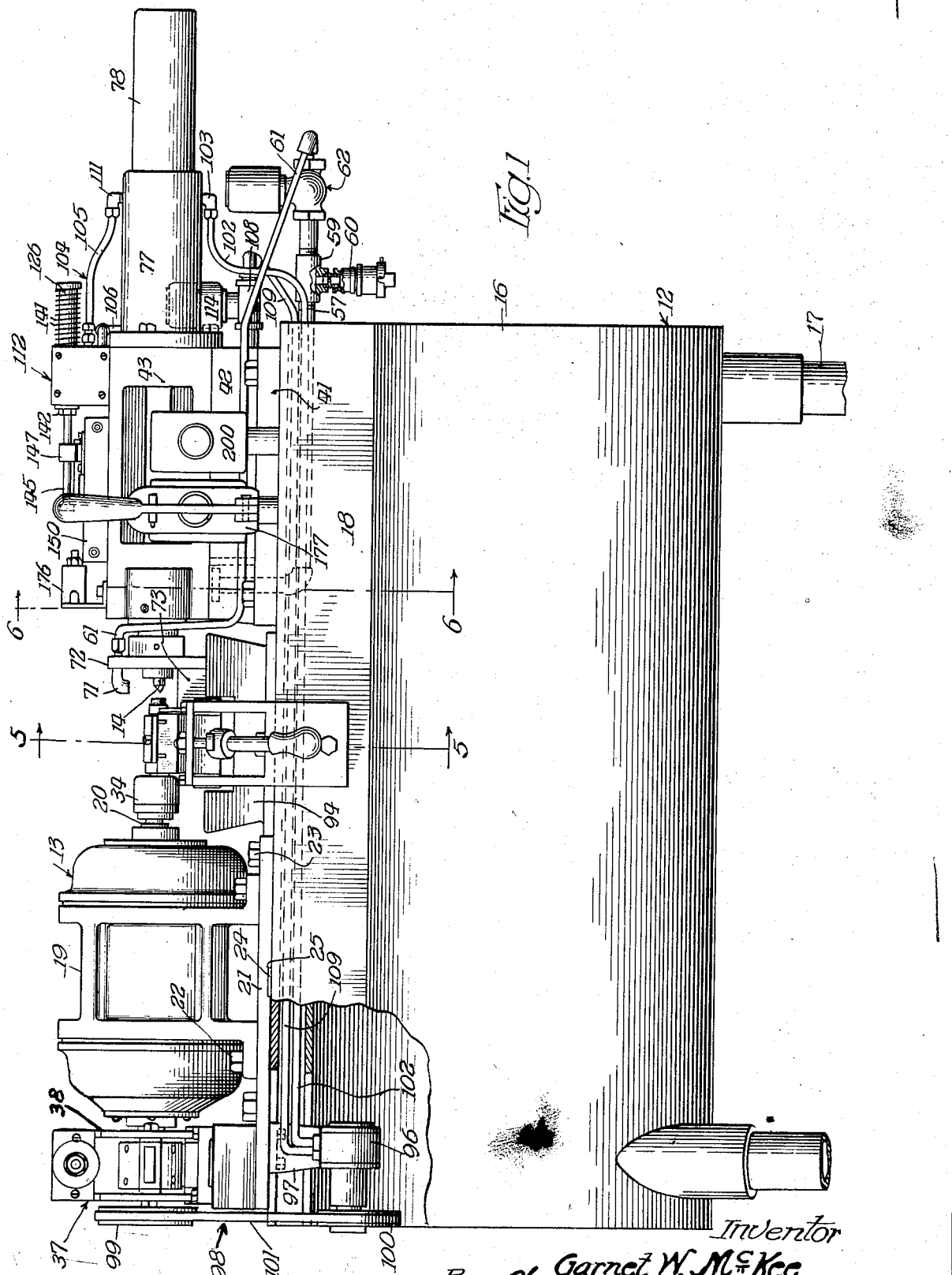

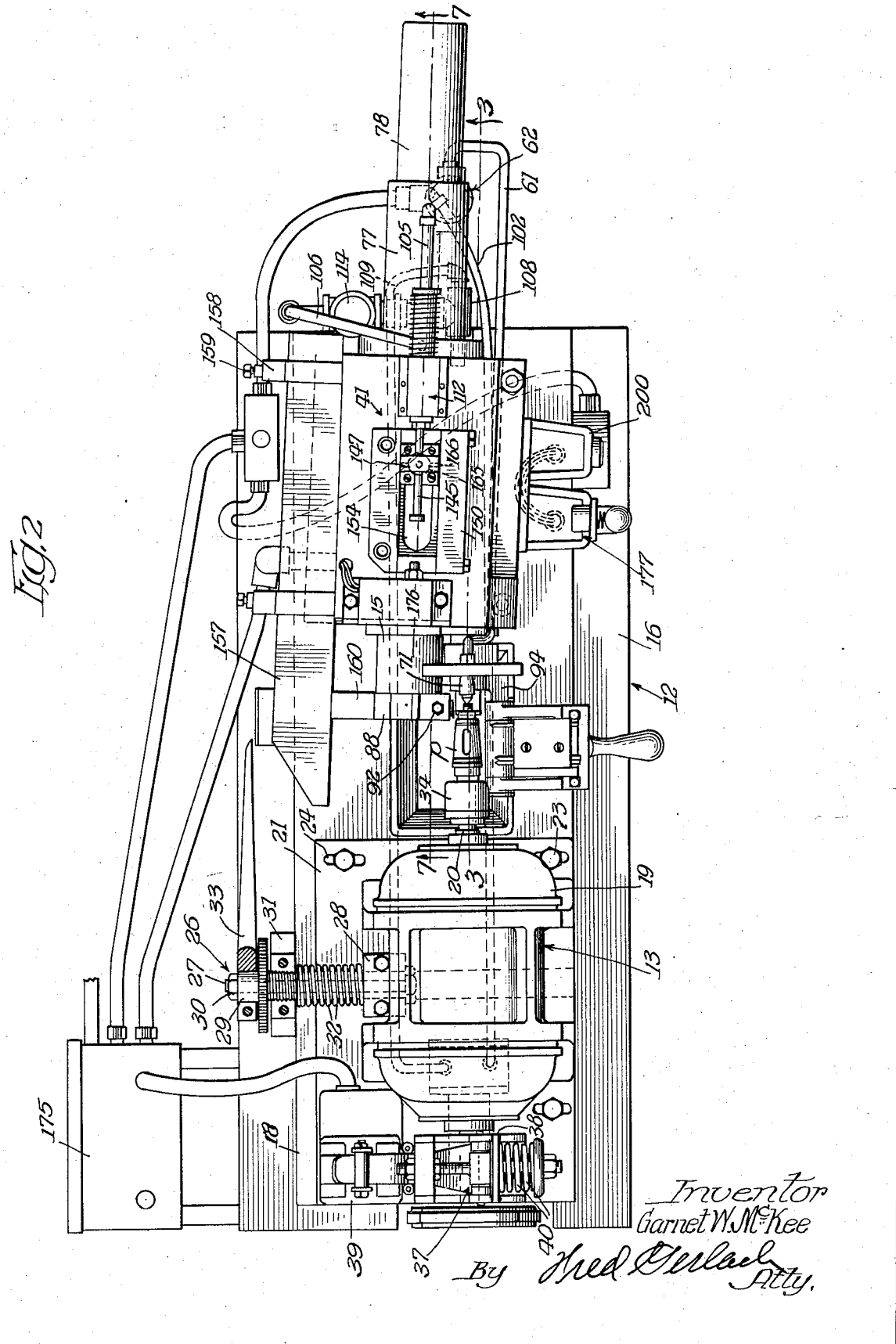

Feb. 20, 1945.  G. W. McKEE  2,369,904
LATHE
Filed April 26, 1943   6 Sheets-Sheet 4
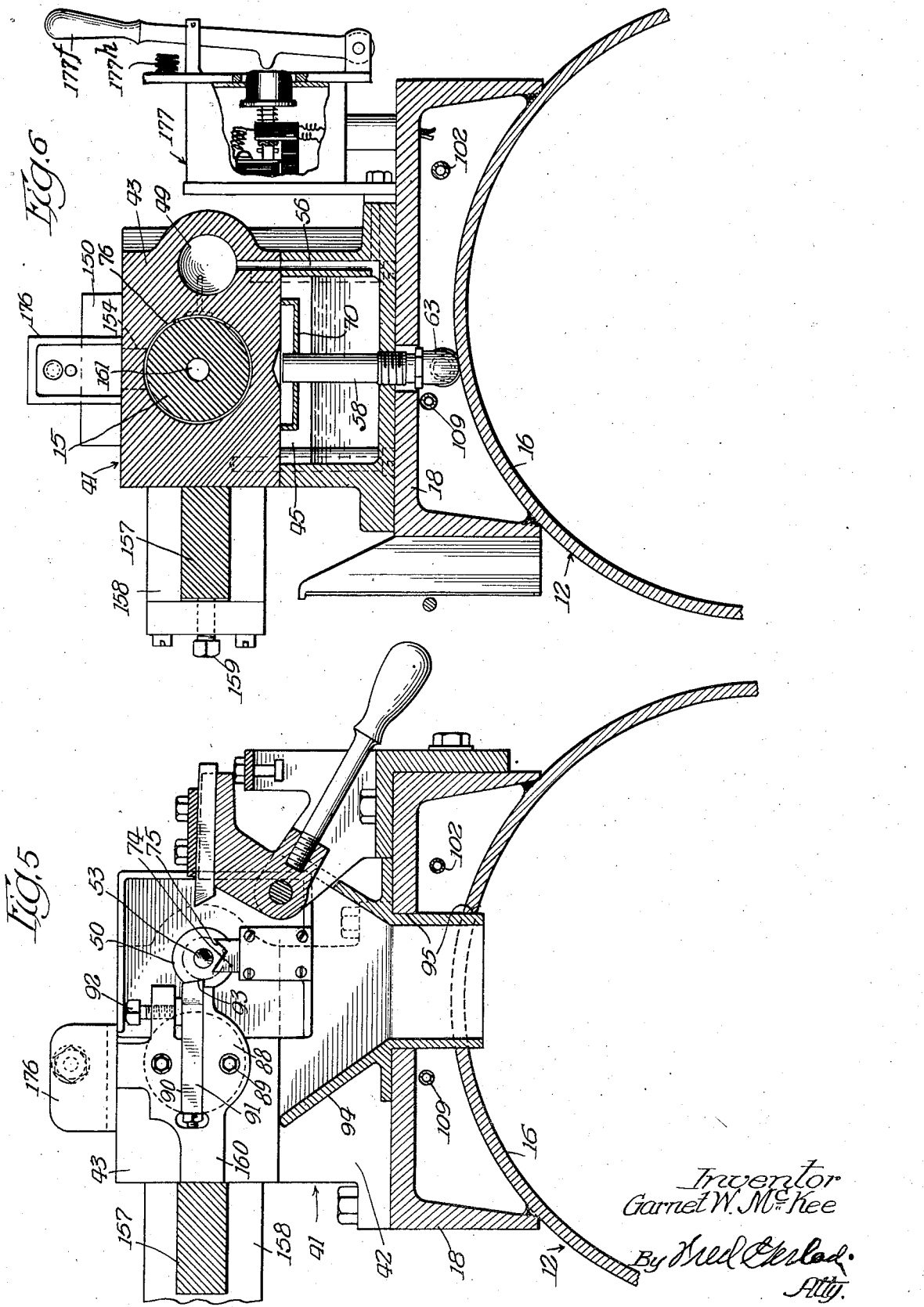
Inventor
Garnet W. McKee
By Fred Eberlad
Atty.

Feb. 20, 1945.   G. W. McKEE   2,369,904
LATHE
Filed April 26, 1943   6 Sheets-Sheet 5
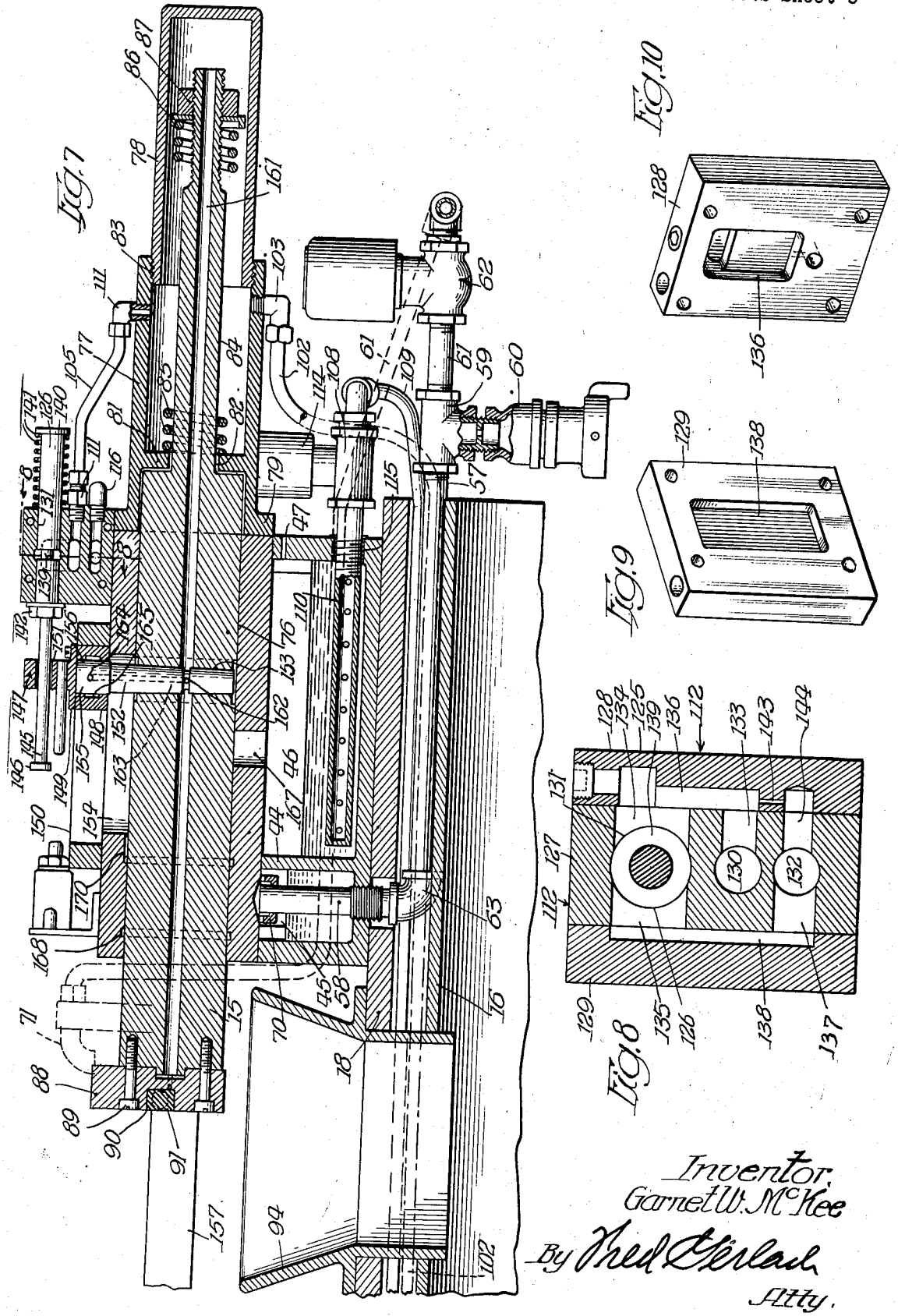
Inventor.
Garnet W. McKee
By Fred Gerlach
Atty.

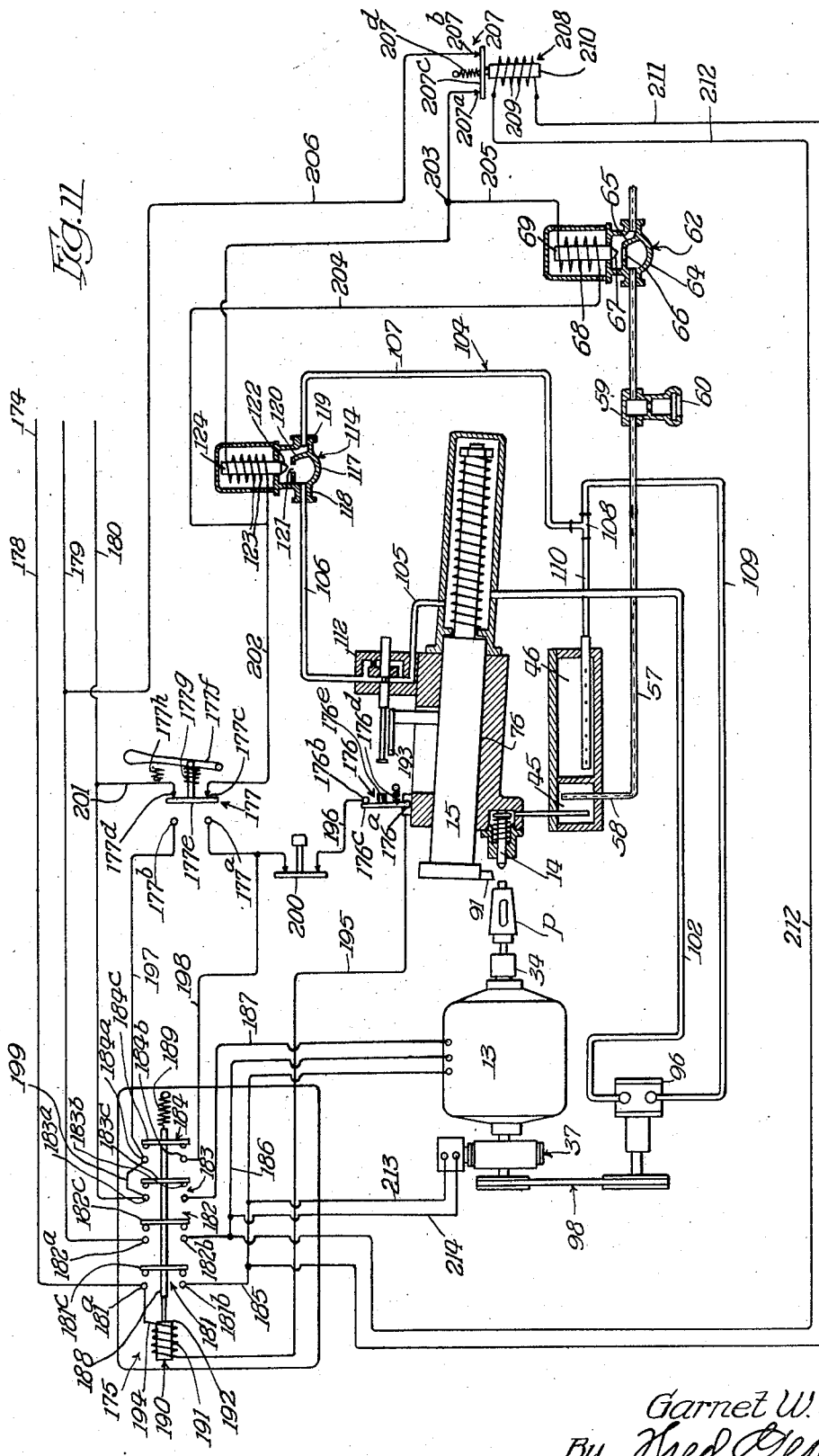

Patented Feb. 20, 1945

2,369,904

UNITED STATES PATENT OFFICE 2,369,904

LATHE

Garnet W. McKee, Rockford, Ill.; Lulu B. McKee, executrix of said Garnet W. McKee, deceased, assignor to herself Application April 26, 1943, Serial No. 484,550

36 Claims. (Cl. 82—2)

The present invention relates generally to lathes. More particularly the invention relates to that type of lathe which is designed to provide a metallic part, such as a cock plug, with a smooth external surface of circular cross section and as its primary parts comprises (1) a horizontally elongated supporting structure, (2) an electric motor which is mounted on one end of the supporting structure in such manner that the armature shaft thereof extends lengthwise or longitudinally of the structure, and has on the inner end of its armature shaft a chuck for supporting the large end of the plug and effecting drive or rotation of the plug in response to operation of the motor, (3) an axially slidable centering pin which is positioned in opposed relation with the chuck and is adapted when shifted towards the chuck after application of the large end of the cock plug to the chuck to engage and support the small end of the plug, and (4) a plunger which is located at one side of the centering pin, has the end thereof that is remote from the chuck slidably mounted in a cylinder on the other end of the supporting structure, embodies at its other or exposed end a laterally extending cutting tool, and is adapted when fluid under pressure is introduced into the cylinder to slide in the direction of the motor and cause the cutting edge of the tool to traverse the plug and provide the desired external surface thereon.

One object of the invention is to provide a lathe of this type which is an improvement upon, and has certain inherent advantages over, previously designed lathes and is characterized by extremely high efficiency and speed of operation.

Another object of the invention is to provide in connection with a lathe of the type and character under consideration novel means or mechanism for automatically controlling the electric motor, the centering pin, and the tool carrying plunger.

Another object of the invention is to provide a lathe of the aforementioned type in which the control means for the centering pin operates directly after the tool equipped plunger completes its stroke to effect shift of the centering pin into its plug releasing position to the end that the plug moves by gravity out of place and hence is not subjected to scratching by the cutting tool during retractile shift of the plunger.

Another object of the invention is to provide a lathe of the aforementioned type and character in which the tool carrying end of the fluid pressure actuated plunger is provided with a laterally projecting block which slides against a guide bar and coacts therewith so as to cause the plunger in connection with its cutting stroke to move truly rectilinearly regardless of any looseness between the plunger and its cylinder.

Another object of the invention is to provide a lathe of the type under consideration in which the electric motor is laterally adjustable with respect to the supporting structure in order that the chuck may be shifted in a sidewise manner with respect to the centering pin for purposes of varying the amount of taper that is formed by the cutting tool on the plug during the cutting stroke of the plunger.

Another object of the invention is the provision of means for jetting air under pressure against the tip or point of the centering pin when it is in its retracted or plug releasing position in order to clean the tip or point of any cuttings or other foreign particles which would preclude the pin from functioning properly when next shifted into its plug supporting position.

A further object of the invention is to provide in connection with a lathe of the type under consideration novel means for lubricating the piston and cylinder and the parts that are associated therewith.

A still further object of the invention is to provide a lathe which is generally of new and improved construction and not only involves a novel arrangement of parts but also is capable of being produced and operated at an extremely low cost.

Other objects of the invention and the various advantages and characteristics of the present lathe will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a side view of a lathe embodying the invention, parts of the supporting structure being broken away in order to show the arrangement and design of the motor driven pump for supplying fluid under pressure into the cylinder in order to produce the cutting stroke of the tool carrying plunger;

Figure 2 is a plan view of the lathe;

Figure 3 is an enlarged vertical longitudinal section taken on the line 3—3 of Figure 2 and illustrating in detail the mounting for the axially slidable centering pin;

Figure 4 is a horizontal section taken on the line 4—4 of Figure 3 and showing in detail the arrangement and design of the block and guide bar for controlling the plunger so that it moves truly rectilinearly in connection with its cutting stroke regardless of any looseness between the plunger and the cylinder;

Figure 5 is an enlarged vertical transverse section on the line 5—5 of Figure 1;

Figure 6 is an enlarged vertical transverse section on the line 6—6 of Figure 1;

Figure 7 is an enlarged vertical longitudinal section taken on the line 7—7 of Figure 2 and illustrating in detail the construction and design of the piston and cylinder and the means for lubricating the latter and the parts that are associated therewith;

Figure 8 is an enlarged vertical transverse section taken on the line 8—8 of Figure 7 and showing in detail the construction and design of the valve for retarding the tool carrying plunger during the initial part of its retractile stroke;

Figures 9 and 10 are perspectives of the side plates of the plunger retarding valve; and Figure 11 is a diagrammatic view of the automatic control means for the electric motor, centering pin and plunger.

The lathe which is shown in the drawings constitutes the preferred form or embodiment of the invention. It has many capabilities of use although it has special utility in providing a tapered cock plug p with a truly conical or tapered external surface. As shown in the drawings, the plug p is of conventional or standard construction and has a cross port in the central portion thereof, a polygonal handle receiving lug at its large end and a reduced externally threaded nut receiving stem at its small end. As its main or primary parts the lathe comprises a supporting structure 12, a three-phase electric motor 13, a centering pin 14, a plunger 15, and automatic control means for the motor, centering pin and plunger.

*Supporting structure*

The supporting structure 12 serves as a medium for holding the various operating parts of the lathe in an elevated position with respect to the floor of the room or space in which the lathe is used and embodies an elongated, horizontally extending, hollow, cylindrical, open ended frame member 16. This member is supported in an elevated position by way of a plurality of depending legs 17 and carries on the upper portion thereof a channel beam 18. The latter extends longitudinally of, and corresponds in length to, the frame member 16 and is arranged so that the side flanges thereof project or extend downwards. The lower edges of the side flanges of the channel beam are welded to the upper portion of the frame member 16 so that the channel beam and frame member are rigidly connected together. The web of the channel beam 18 extends horizontally and is positioned a slight distance above the upper portion of the frame member 16.

*Electric motor and associated parts*

The electric motor 13 is positioned over one end of the channel beam 18 of the supporting structure 12 and comprises a casing 19 and an armature shaft 20. It is arranged so that the armature shaft 20 thereof extends lengthwise of the supporting structure and is mounted on a bed plate 21. The casing of the motor is fixedly secured to the bed plate by way of cap screws 22. The bed plate fits flatly against the upper face of the web of the channel beam 18 and is adjustably secured in place by means of cap screws 23 which extend through horizontally elongated holes 24 in the bed plate. The holes are elongated in a transverse direction relatively to the supporting structure and permit the bed plate and electric motor to be adjusted laterally when the cap screws 23 are loosened. An upstanding rib 24 is suitably fixedly connected to the upper face of the web of the channel beam 18 and is disposed beneath the central portion of the motor 13. This rib fits within a transverse groove 25 in the bottom face of the bed plate 21 and coacts with the groove to form a sliding connection whereby the bed plate and electric motor are confined to truly rectilinear movement in connection with lateral adjustment thereof. As hereinafter described, lateral adjustment of the bed plate and motor in one direction serves to decrease the amount of taper of the plug p and laterally adjustment of the bed plate and motor in the opposite direction serves to increase the amount of taper of the plug. A micrometer type adjusting device 26 is associated with the electric motor 13 and serves to adjust or shift the latter laterally upon loosening of the cap screws 23. This device, as shown in Figure 2, comprises a bolt 27 which projects outwards from one side of the motor casing 19. The head of the bolt is disposed adjacent the motor casing and is maintained in fixed relation with the casing by way of a bracket 28 which is bolted to the bed plate 21. The outer end of the shank of the bolt 27 extends loosely through a sleeve 29 and is provided at its extremity with a nut 30 which engages the outer end of the sleeve. The inner end of the sleeve embodies an external screw thread of extremely small pitch and extends through an internally threaded bore or opening in a bracket 31 on the web of the channel beam 18. A compression spring 32 surrounds the central portion of the shank of the bolt 27 and is interposed between the brackets 28 and 31. If, after loosening of the cap screws 23, the sleeve 29 is turned so that it is caused to feed or move axially away from the bracket 28 it shifts the bolt 27 in such direction as to cause the bed plate and motor to move towards the fixed bracket 31 on the web of the channel beam 18. When the sleeve 29 is reversely rotated after loosening of the cap screws 23 it feeds inwards relatively to the bracket 31 with the result that the compression spring 32 operates to, shift the bed plate and motor away from the bracket 31 a distance corresponding to the amount of inward feed of the sleeve 29. When the bed plate and motor are adjusted into the desired position by turning of the sleeve 29 the cap screws 23 are tightened so as to lock the bed plate and motor in place. An arm 33 is connected to, and extends radially from, the outer end of the sleeve 29 and serves as a medium for turning the sleeve for bed plate and motor adjusting purposes.

The inner end of the armature shaft 20 of the electric motor 13 projects outwards of the motor casing 19 and is provided with a chuck 34 for supporting the large end of the plug p and effecting drive or rotation of the plug in response to operation of the motor. This chuck (see Figure 3) is provided with a central polygonal slot 35 for receiving the polygonal lug on the large end of the plug and embodies a centering pin 36. The latter is in axial alignment with the armature shaft of the motor 13 and has a tapered or pointed end which faces the slot 35 in the chuck and is adapted to fit within a tapered socket in the central portion of the polygonal lug on the plug p. In connection with a surface cutting operation the lug on the large end of the plug is inserted into the slot 35 in the chuck and the plug is adjusted laterally until the pointed end of the centering pin 36 fits within the aforementioned tapered socket. When the point is in the socket the large end of the plug is properly centered with respect to the axis of the armature shaft and the chuck is in driving relation with the lug on the large end of the plug and serves to effect drive or rotation of the plug in response to operation of the electric motor. The slot 35 in the chuck is of slightly larger size than the polygonal lug on the large end of the plug in order to permit the lug to be quickly inserted into, and removed from, the slot.

The outer end of the armature shaft 20 projects beyond the adjacent end of the motor casing 19 and has applied to it a solenoid type brake 37 for stopping the armature immediately upon interruption of the flow of current to the motor. The brake is of standard or conventional construction and comprises an upstanding brake shoe 38 and a solenoid 39. The shoe is hinged at its lower end so that it is free to swing to and from the outer end of the armature shaft. A compression spring 40 is applied to the upper end of the brake shoe and serves to urge the shoe into braking relation with said outer end of the armature shaft. The solenoid 39 comprises a vertically movable armature (not shown) and this in connected to the upper end of the brake shoe by way of a lever arrangement which is so designed or arranged that when the solenoid is energized it forces the brake shoe away from the outer end of the armature shaft against the pressure or force of the compression spring 40. When the solenoid 39 is de-energized the compression spring 40 swings the brake shoe 38 into gripping or braking relation with the outer end of the armature shaft. The electric motor 13 is automatically controlled as hereinafter described and the solenoid 39 of the solenoid brake 37 is in circuit with the motor circuit.

*Centering pin and associated parts*

The centering pin 14 serves as a medium for supporting and holding in place the small end of the plug p during cutting of the plug in connection with operation of the lathe. It is disposed in opposed relation with the chuck 34 on the inner end of the armature shaft 20 and is supported for axial sliding movement by way of a composite or sectional housing 41. The latter comprises a box-like lower section 42 and a block type upper section 43. The lower section 42 is bolted or otherwise fixedly secured to the end of the web of the channel beam that is remote from the electric motor 13. It comprises a bottom wall, a pair of side walls, an inner end wall and an outer end wall and underlies and supports the upper housing section 43. In addition to the aforementioned walls the lower section 42 embodies a transversely extending, upstanding partition 44 and this is disposed slightly inwards of the inner end wall and divides the interior of the lower section 42 into a small sized inner chamber 45 and a large sized outer chamber 46. The cross partition 44 is imperforate with the result that the two chambers do not communicate with one another. The upper section 43 of the housing 41 is fixedly secured to the lower section 42 in any suitable manner and is the same in shape. The bottom face of the upper section extends across the upper edges of the various walls and the cross partition of the lower section and serves to cover the chambers 45 and 46. The inner chamber 45 is partly filled with oil and the latter serves, as hereinafter described, to actuate the centering pin 14. The outer chamber 46 is partially filled with oil and is vented by way of a vent hole 47 in the upper portion of the outer end wall of the lower section 42 of the housing 41. The inner end of the centering pin 14, that is, the end that is farther or remote from the chuck 34, is provided with an enlarged head 48 and is disposed in a cylindrical socket 49 in the inner end portion of the upper section 43 of the housing 41. The central and outer end portions of the centering pin are slidably mounted in a tubular member 50, the inner end of which is provided with a radially extending flange 51 in abutment with the inner end face of the upper housing section 43. Cap screws 52 extend through the flange and the adjacent portion of the upper housing section 43 and serve to hold the tubular member 50 in connected relation with said upper housing section. The outer end portion of the centering pin 14 is provided with a point 53 which when the centering pin is shifted towards the chuck, is adapted to fit within a tapered or conical socket in the externally threaded reduced stem on the small end of the plug p and serves when in the socket to support said small end of the plug. The centering pin is retracted or shifted inwards into a plug releasing position by way of a compression spring 54. The latter surrounds the inner end of the centering pin and has one end thereof in abutment with the enlarged head 48 and its other end in abutment with a shoulder 55 in the central portion of the tubular member 50. The enlarged head 48 coacts with the inner portion of the annular flange 51 to limit sliding movement of the centering pin 14 in the direction of the chuck 34. A vertically extending duct 56 (see Figure 6) is formed in the housing 41 and establishes communication between the bottom portion of the chamber 45 and the bottom portion of the socket 49. Air under pressure is supplied to the upper portion of the chamber 45 by way of a horizontally extending pipe 57 and a vertical pipe 58. The horizontally extending pipe 57 extends lengthwise of that portion of the space between the channel beam 18 and the upper portion of the tubular member 50 that underlies the housing 41. The outer end of the pipe 57 is connected to one of the end branches of a T fitting 59. The central branch of this T fitting is provided with a coupling 60 for connection to any suitable source of air under pressure. The other end branch of the T fitting is connected to one end of an exhaust pipe 61 and such pipe, as shown in Figure 7, has a solenoid valve 62 associated with it. The vertical pipe 58 is disposed in the chamber 45 in the inner portion of the lower section 42 in the housing 41 and is arranged so that the upper end thereof terminates adjacent the upper portion of the chamber at a point above the level of the oil in the chamber. The lower end of the pipe 58 extends through a sealed hole in the bottom wall of the lower housing section 42 and is connected to the inner end of the horizontally extending pipe 57 by an elbow 63. As shown diagrammatically in Figure 11, the solenoid valve 62 in the exhaust pipe 61 comprises a casing 64 having in the interior thereof a partition 65 with a valve seat 66 therein. It also comprises a vertically movable valve member 67 which is urged downwards into seated relation with the seat either by gravity or a spring. The solenoid part of the solenoid valve 62 comprises a coil 68 and a vertically movable armature 69. The valve member 67 is applied to the lower end of the armature. When the solenoid part of the solenoid valve 62 is energized the armature 69 is retracted and shifts the valve member 67 upwards into its open position. When the solenoid part of the valve is de-energized the armature 69 moves downwards and effects closing of the valve member 67. When the solenoid valve 62 is closed as the result of the solenoid part being energized air under pressure flows through the pipes 57 and 58 into the upper portion of the chamber 45 and creates such pressure that the oil in the chamber is forced upwards through the duct 56 into the socket 49. The oil that enters the socket as the result of closing of the solenoid valve 62 forces the centering pin 14 so that it slides towards the chuck 35 into its plug supporting position. When the solenoid valve 62 is opened the pressure within the upper portion of the chamber 45 is dissipated with the result that the oil in the socket 49 flows back into the chamber 45 and releases the centering pin 14 so that it is retracted by the action of the compression spring 54. From the foregoing it is manifest that when the solenoid valve 62 is closed the centering pin 14 moves into its operative or plug supporting position and when the solenoid valve 62 is opened the centering pin 14 is shifted rearwards into its retracted position by the spring 54. The upper end of the vertical pipe 58 is surrounded by a cup shaped baffle 70 so as to prevent oil in the chamber 45 from entering the pipe 58 when the pressure within the chamber is released as a result of the opening of the solenoid valve 62. The discharge end of the exhaust pipe 61 is arranged so that it extends along one side of the housing 41 and is provided at its extremity with a nozzle 71. This nozzle is carried by a bracket 72 on the tubular member 50 that serves slidably to support the centering pin 14. It is directed downwards towards the point 53 of the centering pin and serves, when the solenoid valve 62 is opened for the purpose of effecting shift of the centering pin 14 into its retracted or plug releasing position, to jet air downwards onto said point 53. The jet of air that emanates from the nozzle 71 in connection with opening of the solenoid valve 62 operates to clean the point 53 of any cuttings or other foreign particles which would preclude the pin from functioning properly when next shifted into its plug supporting position. When the solenoid is closed in order to effect shift of the centering pin 14 into its plug supporting position no air emanates from the nozzle 70. However, air does emanate from the nozzle for point cleaning purposes immediately upon opening of the solenoid valve 62. The bracket 72 embodies a depending member 73 which underlies the outer end of the tubular member 50 and carries an upstanding plate 74. The upper portion of this plate is provided with a V-shaped notch 75 which is adapted to receive the reduced, externally threaded stem on the small end of the cock plug p before shift of the centering pin 14 into its plug supporting position, and also to receive the externally threaded stem on the small end of the plug immediately upon retraction of the centering pin into its plug releasing position. The notch 75 is located beneath and to one side of the point 53 of the centering pin 14 with the result that when the reduced externally threaded stem on the small end of the plug is disposed therein the stem is not truly aligned with the point 53 of the centering pin 14 and the plug is in a non-cutting position. When the centering pin 14 is shifted towards the chuck into its plug supporting position the point 53 enters the conical socket in the stem on the small end of the plug and, due to the resultant cam action, raises and shifts laterally the small end of the plug until the plug is in truly centered relation with the chuck 34 and the centering pin. When the centering pin 14 is retracted after a plug cutting operation the small end of the plug, after release of the point 53 from the reduced externally threaded stem on the plug, drops downwards until the stem comes into contact or engagement with the notch defining portion of the plate 74. As soon as the stem engages the notch the small end of the plug is shifted laterally because of the arrangement or position of the notch 75. In connection with a plug cutting operation the operator of the lathe inserts the polygonal lug on the large end of the plug into the slot 35 in the chuck 34 and then releases the plug. Upon release of the plug the small end moves downwards and laterally. As soon as the centering pin 14 is shifted toward the chuck 34 preparatory to a cutting operation the point 53, as previously pointed out, enters the conical socket in the threaded stem of the plug and shifts the plug upwards and laterally into its plug cutting position. As soon as the centering pin 14 is released after cutting of the plug the small end of the plug moves downwards and sidewise into a noncutting position and hence is not subjected to scratching or marring during the retractile stroke of the plunger 15.

*Plunger and associated parts*

The plunger 15 is located at one side of the centering pin 14 as shown in Figures 4, 5 and 6. The notch 75 in the upper portion of the plate 74 is positioned at one side of the centering pin and the plunger is disposed at the other side of the pin. The end of the plunger that is remote from the chuck 34 is slidably mounted in a cylinder 76 in the upper section 43 of the housing 41 in order that the plunger as a whole is slidable towards and away from the chuck. The cylinder 76 extends through both end faces of the upper housing section 43 and has the rear end thereof, that is, the end that is remote from the electric motor, closed by a tubular member 77 and a cup shaped member 78. The tubular member 77 has at the inner end thereof an annular flange 79 and this fits or abuts against the outer end face of the upper housing section 43. Cap screws 80 extend through the flange 79 and into the upper housing section 43 and serve removably to secure in place the tubular member 77. The interior of said tubular member is aligned with, and of slightly greater diameter than, the cylinder 76 (see Figure 7). A cross wall 81 extends across the central portion of the interior of the tubular member 77 and embodies a central hole 82. The cup shaped member 78 is axially aligned with, and disposed outwards of, the tubular member 77 and comprises a cylindrical or annular side wall and a cross wall. The cross wall is connected to, and extends across, the outer end of the side wall and the inner margin of the side wall extends into the outer end of the tubular member 77 and is removably secured in place by a screw thread connection 83. The members 77 and 78 constitute parts of the housing 41. The inner end of the plunger 15 is provided with a centrally disposed longitudinally extending stem 84 and this extends loosely through the hole 83 in the cross wall 81 of the tubular member 77 and projects into the interiors of the members 77 and 78. The plunger 15 is retracted, that is, slid or shifted away from the electric motor 13, by way of a compression spring 85 which surrounds the stem 84. The inner end of the compression spring abuts against the cross wall 81 and the outer end abuts against a washer 86 which is mounted on the free end of the stem 84 and is adjustably held in place by means of a nut 87. A horizontally elongated block 88 is fixedly secured to the outer end of the plunger 15 by way of screws 89. This block projects laterally in both directions from the outer or exposed end of the plunger and has in the central portion thereof a horizontal groove 90. This groove extends transversely of the plunger and serves as a seat for a cutting tool 91. The latter is removably held in place by a set screw 92 and has on the end thereof that is near the centering pin 14 a cutting edge 93. When the plunger is shifted towards the electric motor 13 the cutting tool 91 traverses the plug $p$ and the cutting edge of the tool cuts the desired external side surface on the plug. The cylinder 76 for the inner end of the plunger extends horizontally. It is, however, positioned at a small acute angle with respect to the axis of the centering pin 14 with the result that during the cutting stroke of the plunger the cutting edge of the tool forms a conical or tapered external side surface on the plug. If a gradual tapered surface is desired on the plug the bed plate 21 and the electric motor 13 are adjusted laterally towards the axis of the plunger and this is accomplished by loosening the cap screws 23 and manipulating the sleeve 29 so that it feeds or moves axially away from the bracket 28. If it is desired to increase the taper of the surface which is formed on the plug by the cutting edge of the tool in connection with shift of the plunger toward the electric motor, the bed plate and electric motor are adjusted laterally in the opposite direction, i. e., away from the axis of the plunger.

A hopper 94 underlies the chuck 34 and the tubular member 50 and serves to catch and direct downwards the cuttings resulting from the action of the tool 92 during shift of the plunger 15 toward the electric motor 13. The lower end of this hopper extends through aligned holes 95 in the web of the channel beam 18 and the upper portion of the frame member 16 and serves to direct the cuttings into the interior of the frame member. The cuttings which accumulate in the bottom of the frame member may be removed from either end of said frame member.

As hereinafter described, current is supplied to the electric motor 13 during the cutting stroke of the tool carrying plunger 15 so as to effect rotation of the plug as the cutting edge 93 traverses the side of the plug. When the plunger reaches the end of its cutting stroke the supply of current to the motor automatically ceases. The plunger is shifted towards the electric motor for plug cutting purposes by introducing oil under pressure into the interiors of the tubular member 77 and the cup shaped member 78. A gear pump 96 serves as the medium for supplying oil under pressure into the interiors of the members 77 and 78 and this pump, as shown in Figure 1, is suspended from the outer end of the bed plate 21 by way of a bracket 97. Such bracket extends through cutouts in the web of the channel beam 18 and the upper portion of the frame member 16 and connects the pump to the bed plate so that it is adjustable therewith. The pump 96 is driven from the electric motor 13 by way of a pulley and belt connection 98. The latter comprises a pulley 99 on the outer end of the armature shaft 20 of the electric motor 13, a pulley 100 on one end of the drive shaft of the gear pump 96 and an endless belt 101. The belt, as shown in Figure 1, extends around the two pulleys. The pressure side of the pump 96 is connected to the interiors of the members 77 and 78 by a pipe 102. One end of this pipe is connected to the pump outlet and the other end is connected to the bottom portion of the tubular member 77 by way of a fitting 103. The pipe 102 extends through the space between the channel beam 18 and the upper portion of the frame member 16 (see Figure 1) and is sufficiently flexible to permit the pump to move with the bed plate 21 in connection with lateral adjustment of the electric motor 13. A return pipe 104 leads from the interiors of the members 77 and 78 to the suction side of the gear pump 96. This return pipe comprises a pipe section 105, a pipe section 106, a pipe section 107, a T fitting 108, a pipe section 109, and a branch pipe 110. One end of the pipe section 105 is connected to the upper portion of the tubular member 77 by a fitting 111 and the other end of the pipe section 105 is connected to a retarding valve 112 by a fitting 113. The pipe section 106 of the return pipe 104 leads from the retarding valve 112 to a solenoid valve 114. The pipe section 107 leads from the solenoid valve 114 to the central branch of the T fitting 108. The pipe section 109 leads from one end branch of the T fitting 108 to the inlet in the casing of the gear pump 96. The branch pipe 110 of the return pipe 104 leads from the other end branch of the T fitting 108 through a hole 115 in the outer end wall of the lower housing section 42 into the bottom portion of the chamber 46. The inlet end of the pipe section 106 is connected to the retarding valve 112 by a fitting 116. The solenoid valve 114 comprises a casing 117 having an inlet 118 at one end and an outlet 119 at its other end. The interior of the casing 117 is divided by way of a partition 120 and this is provided with an annular valve seat 121. The solenoid valve 114 also comprises a vertically movable valve member 122 which is urged downwards into seated relation with the valve seat 121 either by gravity or a spring. The solenoid part of the solenoid valve 114 is located above the casing 117 and comprises a coil 123 and a vertically movable armature 124. The valve member 122 is applied to the lower end of the armature. When the solenoid part of the solenoid valve 114 is energized the armature 124 is retracted and shifts the valve member 122 upwards into its open position. When the solenoid part of the solenoid valve 114 is de-energized the armature 124 moves downwards and effects closing of the valve member 122. As hereinafter described, the solenoid part of the solenoid valve 114 is de-energized while the electric motor 13 is in operation and is energized when the electric motor is not in operation. In other words, when the motor is in operation the solenoid valve 114 is closed and when the electric motor is not in operation the solenoid valve 114 is open. When the motor is in operation it serves to drive the gear pump 96 and the latter serves to supply oil under pressure into the interiors of the members 77 and 78. Because the solenoid valve 114 is closed when the electric motor 13 is in operation the oil under pressure in the interiors of the members 77 and 78 builds up and causes the tool carrying plunger 15 to slide towards the electric motor 13 and effect cutting or surfacing of the cock plug $p$. When the electric motor 13 is caused, as hereinafter described, to stop at the end of a cutting stroke of the plunger the pump 96 stops and the solenoid valve 114 opens. As soon as the solenoid valve opens the interiors of the member 77 and 78 are vented with the result that the tool carrying plunger 15 is retracted by the action of the compression spring 86. During the retractile stroke of the plunger the oil in the interiors of the members 77 and 78 is forced through the pipe section 105, the retarding valve 112, the pipe section 106, the casing 117 of the solenoid valve 114, the pipe section 107, and the branch pipe 110 into the chamber 46 in the lower housing section 42. The discharge end of the pipe section 106 is connected to the inlet 118 of the casing 117 of the solenoid valve 114. The inlet end of the pipe section 107 is connected to the outlet 119 of the casing 117. The portion or end of the branch pipe 110 that is disposed in the chamber 46 extends horizontally, as shown in Figure 7, and is located adjacent the bottom of the chamber 46. It has side holes therein for establishing communication between its interior and the body of oil in the chamber 46. When the gear pump 96 is driven as the result of the supply of current to the electric motor 13 the solenoid valve 114 is closed, as previously pointed out. As soon as the gear pump is set into operation it draws oil from the chamber 46 by way of the branch pipe 110 and the pipe section 109 and forces the oil under pressure through the pipe 102 into the interiors of the members 77 and 78 where the oil builds up pressure and forces the tool carrying plunger 15 towards the motor for plug surfacing purposes.

As described hereafter, the coil 123 of the solenoid part of the solenoid valve 114 and the coil 68 of the solenoid part of the solenoid valve 62 are in circuit. As a result of this the two valves open and close simultaneously. Also, as hereinafter described, the two valves are closed when the lathe is started in connection with a plug cutting or surfacing operation and are opened as soon as the plunger 15 reaches the end of its cutting stroke. The retarding valve 112 operates to retard the tool carrying plunger 115 during the initial part of its retractile stroke in order to provide ample or sufficient time for the centering pin 14 to retract. As the result of the delaying action of the valve 112 the plug, after cutting or surfacing thereof, is released and drops out of its cutting position before retraction of the plunger and hence there is no likelihood of the cutting edge 93 of the tool 91 marring or scratching the cut tapered side surface of the plug during retraction of the plunger. The valve 112 is mounted on the outer end portion of the top face of the upper housing section 43 and comprises a box-like casing 125 and a spool type valve member 126. The casing 125 overlies the end of the cylinder 76 that communicates with the inner end of the interior of the tubular member 77 and consists of a rectangular inner block 127 and a pair of side plates 128 and 129. The inner block and side plates extend lengthwise of the cylinder and plunger and are suitably secured together. The inner plug 127 has a horizontal, longitudinally extending inlet duct 130 in its central portion, a horizontal, longitudinally extending bore 131 in its upper portion and a horizontal, longitudinally extending outlet duct 132 in its lower portion. One end of the inlet duct 130 terminates adjacent the central portion of the inner block 127 of the valve casing 125 and the other end leads through the rear end face of said inner block. The fitting 113 at the discharge end of the pipe section 105 of the return pipe 104 is connected to said other end of the inlet duct 130. The inner end of the inlet duct 130, that is, the end that terminates adjacent the central portion of the inner block 127, is provided with a laterally extending outlet port 133 and this leads to and through the side face of the block that is engaged by the side plate 128. The bore 131 extends through both end faces of the inner block 127 of the valve casing 125 and serves slidably to support the spool type valve member 126. An inlet port 134 is formed in the inner block 127 and leads from the side face of the block that is engaged by the side plate 128 to the central portion of the bore 131. An outlet port 135 is formed in the upper portion of the inner block 127 of the valve casing 125 and this is aligned with the inlet port 134 and leads to and through the side face of the block that is engaged by the side plate 129 (see Figure 8). A vertically extending passage 136 is formed in the inner portion of the side plate 128 of the valve casing 125 and serves to establish communication between the outlet port 133 and the inlet port 134. The outlet duct 132 is disposed in the inner block 127 directly beneath the inlet duct 130. One end of the outlet duct 132 terminates adjacent the central portion of the block 127 and the other end leads through the rear end face of the block as shown in Figure 7. The fitting 115 at the inlet end of the pipe section 106 of the return pipe 104 is connected to said other end of the outlet duct 132. An inlet port 137 leads laterally from the inner end of the outlet duct 132, that is, the end that terminates adjacent the central portion of the block 127, to and through the side face of the block that is engaged by the side face 129. A vertically extending passage 138 is formed in the inner face portion of the side plate 129 and establishes communication between the outlet port 135 and the inlet port 137. The spool type valve member 126 is provided with an annular groove 139 and is adapted normally to assume an open position wherein the groove 139 is in registry with, and establishes communication between, the inlet port 134 and the outlet port 135. It is further adapted when shifted in the direction of the electric motor 13, as hereinafter described, to assume a closed position wherein the groove 139 is out of registry with the ports 134 and 135. The rear end of the spool type valve member 126, that is, the end that is farther from the electric motor 13, projects outwards of the valve casing 125 and is provided at its extremity with an enlarged head 140. A compression spring 141 surrounds the rear projecting end of the valve member 126 and serves to urge the valve member into its open position. One end of the spring 141 abuts against the rear end face of the inner block 127 of the valve casing 125 and the other end abuts against the enlarged head 140. A stop nut 142 on the front end of the spool type valve member 126 limits rearward sliding movement of the valve member beyond its open position. The spring 141, as previously pointed out, normally maintains the valve member 126 in its open position. When the valve member is in its open position while the solenoid valve 114 is in its open position oil is permitted to flow through the retarding valve 112 as follows: inlet duct 130, outlet port 133, passage 136, inlet port 134, groove 139, outlet port 135, passage 138, inlet port 137 and outlet duct 132. A bleed or by-pass port 143 is formed in the side plate 128 and leads downwards from the bottom portion of the passage 136 to a passage 144. The latter leads to, and communicates with, the inner end of the outlet duct 132. When, as hereinafter described, the spool type valve member 126 is shifted forwards into its closed position at the conclusion of the cutting stroke of the tool carrying plunger 15 there is a restricted flow of oil from the inlet duct 130 to the outlet duct 132. Such restricted flow results in the plunger moving rearwards extremely slowly. The front end of the spool type valve member 126 is provided with a forwardly extending rod 145. This rod is in axial alignment with the valve member 126 and provided at its forward or free end with an enlarged head 146 which coacts with a slide block 147 to effect shift of the spool type valve member 126 into its closed position at the end of the cutting stroke of the tool carrying plunger 15. The slide block 147 is of two-piece design and comprises a rectangular bottom part 148 and a top part 149. The bottom part engages and is supported by the top face of the upper housing section 43 and is mounted in a horizontal rectangular frame 150 so that it is free to slide back and forth lengthwise of the cylinder 76. The frame 150 overlies and extends lengthwise of the cylinder. It is fixedly connected in any suitable manner to the top face of the upper housing section 43 and coacts with the slide block 147 to prevent turning or rotation of the plunger. The top part 149 of the slide block 147 is rigidly connected to the bottom part 148 and has formed therein a horizontal hole 151 through which the rod 145 extends loosely. The slide block 147 is connected for conjoint sliding movement with the plunger 15 by way of a vertically extending pin 152. The lower end of this pin is tapered and is driven into a tapered cross hole 153 in the central portion of the plunger 15. The upper end of the pin extends through a longitudinal slot 154 in the portion of the upper housing section 43 that overlies the cylinder 76, and is provided with a cylindrical head 155. The latter fits within a socket 156 in the bottom part 148 of the slide block 147. As shown in Figure 2, the slot 154 is of less width than the elongated space within the frame 150. The slide block 147 is so arranged or positioned that the top part 149 thereof strikes against the enlarged head 146 on the front end of the rod 145 as the tool carrying plunger 15 approaches the end of its cutting stroke. As the plunger reaches the end of its cutting stroke the stop part 149 of the slide block shifts the spool type valve member 146 of the retarding valve 112 into its closed position against the force of the compression spring 141. During the initial portion of the retractile stroke of the plunger 55 the slide block 147 moves towards the casing 125 of the valve 112 and the spring 141 serves to shift or slide the spool type valve member 126 into its open position. As soon as the valve member 126 reaches its open position as the result of abutment of the stop nut 142 with the front end face of the inner block 127 of the casing 125 of the retarding valve the slide block 147, in connection with completion of the retractile stroke of the plunger, slides rearwards relatively to the rod 145. As hereinafter pointed out, the solenoid valves 62 and 114 are opened and the electric motor 13 is stopped when the tool carrying plunger 15 reaches the end of its cutting stroke. As soon as the solenoid valve 62 opens the centering pin 14 is retracted by the compression spring 54. As soon as the solenoid valve 114 is opened the oil in the members 77 and 78 is permitted to flow into the chamber 46 and releases the plunger so that it is retracted by the action of the compression spring 85. During the initial part of the retractile movement of the plunger the spool type valve member 126 of the retarding valve 112 is in its closed position. However, while the valve member is in such position oil is permitted to flow from the inlet duct 130 into the outlet duct 132 through the bleed or by-pass port 143. The flow of oil through this port is restricted with the result that the initial part of the retractile stroke of the plunger is retarded. As soon as the valve member 126 of the retarding valve 112 is shifted into its open position after the initial part of the retractile stroke of the plunger there is a free flow of oil through the retarding valve and the plunger is hence permitted to slide quickly away from the chuck 34. The valve 112 serves merely as a medium for causing the plunger to move slowly, that is, in a retarded manner during the initial part of its retractile stroke. During the retarded initial part of the retractile stroke of the plunger the centering pin is retracted by its compression spring 54 and releases the plug $p$ with the result that the plug drops by gravity out of its cutting position and hence is not subjected to scratching or marring by the cutting edge 93 of the tool 91 as the cutting edge passes by the plug in connection with completion of the retractile stroke of the plunger.

In order to cause the tool carrying plunger 15 in connection with its cutting stroke to move truly rectilinearly regardless of any looseness between the plunger and its cylinder 76 a guide bar 157 is provided. This bar is disposed in a horizontal position and extends longitudinally of the supporting structure 12. It is disposed adjacent that side of the housing 41 that is opposite the centering pin 14. The inner side face of the guide bar 157 is lapped so that it is flat throughout. The rear or outer end of the guide bar fits flatly against the adjacent side face of the upper housing section 43 and is secured in place by way of a pair of U-shaped brackets 158. Said adjacent side face of the upper housing section 43 is also lapped and is disposed in parallel relation with the axis of the cylinder 76. The free ends of the legs of the brackets 158 are bolted or otherwise fixedly secured to said upper housing section 43 and are arranged in straddled relation with the rear end of the guide bar 157. Screws 159 extend through the central portions of the cross parts of the brackets 158 and serve to clamp the rear end of the guide bar in place. The inner or front end of the guide bar 157 projects beyond the housing 41, as shown in Figure 2. The tool carrying block 88 is provided with an extension 160 and this has a lapped outer end face which engages slidably the inner or front portion of the inner side face of the guide bar 157. During reciprocation of the plunger 15 the extension slides on the inner end of the guide bar 157 and coacts therewith to cause the plunger to move truly rectilinearly regardless of any looseness between the plunger and the cylinder 76. The extension 160 and the cutting tool 91 project horizontally in opposite directions. As the result of the action of the extension 160 and the guide bar 157 the cutting edge 93 of the tool 91 forms a truly conical or tapered side surface on the plug $p$ during the cutting stroke of the plunger.

The inner faces of the side pieces of the frame 150 are supplied with oil from the interiors of the members 77 and 78 by way of a longitudinal duct 161 in the tool carrying plunger 15, an annular groove 162 in the central portion of the pin 152, a vertically extending longitudinal passage 163 in the pin, a cross port 164 at the upper end of the passage 163, an annular groove 165 in the socket defining portion of the bottom part 148 of the slide block 147, and a pair of diametrically opposite, horizontal ports 166 in the side portions of said bottom part 148. The duct 161 extends throughout the full length of the plunger 15 and the stem 84, as shown in Figure 7. The rear end of the duct is open with the result that when oil under pressure is pumped into the interiors of the members 77 and 78 by the gear pump 98 a portion of the oil flows into and through the duct 161. The annular groove 162 in the central portion of the pin 152 is in registry and communication with the central portion of the duct 161 and permits oil to flow from the rear end of the duct 161 to the front end. The lower end of the vertical longitudinally extending passage 163 communicates with the annular groove 162. The cross port 164 establishes communication between the upper end of the passage 163 and the annular groove 165 in the bottom part 148 of the slide block 147. The ports 166 lead outwards from the annular groove 165 and open onto the inner faces of the side pieces of the frame 150. When oil under pressure is supplied by the gear pump 96 to the interiors of the members 77 and 78 a portion of such oil flows through the duct 161, then into the annular groove 162, then upwards through the passage 163, then into the annular groove 165 via the cross port 164 and from the annular groove through the ports 166 onto the inner faces of the side pieces of the frame 150. By lubricating such side faces the slide block 147 slides freely in the frame in connection with reciprocation of the tool carrying plunger 15. Any excess oil which builds up on the inner faces of the side pieces of the frame flows downwards through the longitudinal slot 154 onto the upper central portion of the plunger 15 and serves to lubricate such plunger. The oil which flows onto the upper central portion of the plunger flows around the central portion of the cylinder 76 and flows into the chamber 46 via a hole 167 in the lower portion of the upper housing section 43. The front end of the cylinder 76, that is, the end that is nearer the electric motor 13, is provided with a pair of spaced apart ring shaped oil grooves 168. These grooves are cross connected by a longitudinally extending grove 169. The upper portion of the inner annular groove 168 communicates with the front end of the slot 154 by way of a longitudinal groove 170. The central portion of the plunger is provided with an annular exterior groove 171 and this communicates with the slot 154 and serves to supply oil from the slot to the central portion of the cylinder. The front end of the cylinder is lubricated by way of a longitudinal duct 172 which, as shown in Figure 4, leads from the inner end of the interior of the tubular member 77 to that portion of the front end of the cylinder which is between the annular grooves 168. Any excess oil that is supplied to the front end of the cylinder by the duct is delivered to the slot 154 by way of the groves 168, 169 and 170. The front end of the inner face of the guide bar 157 is lubricated by way of a horizontal passage 173 in the block 88. One end of this passage communicates with the front end of the longitudinal duct 161 in the plunger 15 and the other end of the passage extends through the extension 160 and opens onto the front end of the inner face of the guide bar.

When oil under pressure is supplied by the gear pump 96 to force the plunger 15 towards the electric motor for plug cutting purposes the portion of the oil that flows into the front end of the duct 161 flows through the passage 173 in the tool carrying block 88 and serves to lubricate the face portions of the extension 160 and the guide bar 157 that are in sliding engagement.

*Automatic control means for motor, centering pin and plunger*

Figure 11 of the drawings shows in a diagrammatic manner the various automatic control means for the operating parts of the lathe. Such means include a three-phase current supply 174, a multiple switch mechanism 175, a limit switch 176 and a starter switch 177. The three-phase current supply 174 consists of three lines 178, 179 and 180. The multiple switch mechanism 175 is of the normally open variety and embodies four switches 181, 182, 183 and 184. The switch 181 consists of a pair of spaced apart contacts 181ᵃ and 181ᵇ and a bridge member 181ᶜ. The contact 181ᵃ is connected to the line 178 and the contact 181ᵇ is connected to the stator of the electric motor 13 by a conductor 185. The switch 182 consists of a pair of spaced apart contacts 182ᵃ and 182ᵇ and a bridge member 182ᶜ. The contact 182ᵃ is connected to the line 179 and the contact 182ᵇ is connected by a conductor 186 to the stator of the electric motor 13. The switch 183 consists of a pair of spaced apart contacts 183ᵃ and 183ᵇ and a bridge member 183ᶜ. The contact 183ᵃ is connected to the line 180 and the contact 183ᵇ is connected by a conductor 187 to the stator of the electric motor 13. The switch 184 is for a hereinafter described holding circuit and consists of a pair of spaced apart contacts 184ᵃ and 184ᵇ and a bridge member 184ᶜ. The bridge members of the four switches 181, 182, 183 and 184 are mounted on an insulated slide rod 188 and are adapted when the rod is shifted in one direction to effect closing of all four switches and when the rod is shifted in the opposite direction to open the four switches. A tension spring 189 is applied to one end of the slide rod 188 and serves to urge the rod into a position wherein the four bridge members 181ᶜ, 182ᶜ, 183ᶜ and 184ᶜ are out of bridging relation with their respective contacts. A solenoid 190 serves when energized to shift the rod 188 into a position wherein the four bridge members effect closing of the four switches 181, 182, 183 and 184. This solenoid comprises a coil 191 and an armature 192. The armature is applied to the other end of the rod 188. When the solenoid 190 is energized it effects closing of the four switches constituting parts of the multiple switch mechanism 175. When the switches 181, 182 and 183 are closed the 3-phase circuit for the electric motor 13 is established with the result that the motor is set in operation. The limit switch 176 is a normally closed switch and is located on the front end of the upper housing section. It comprises a pair of spaced apart contacts 176ᵃ and 176ᵇ and a movably mounted bridge member 176ᶜ. The bridge member is urged into contact or bridging relation with the two contacts 176ᵃ and 176ᵇ by a tension spring 176ᵈ. It is provided with a button 176ᵉ which projects rearwards and is aligned with a finger 193 on the top part 149 of the slide block 147. This finger, as shown in Figure 7, underlies and is disposed in parallel relation with the control rod 145 for the retarding valve 112 and is so arranged that when the tool carrying plunger 15 reaches the end of its cutting stroke it moves into engagement with the button 176ᵉ and forces the bridge member 176ᶜ into its open position against the force of the compression spring 176ᵈ. One end of the coil 191 of the solenoid 190 is connected to the contact 181ᵃ of the switch 181 by a conductor 194. The other end of the coil 192 is connected by a conductor 195 to the contact 176ᵃ of the limit switch 176. The starter switch 177 is mounted on the housing 41 and is of the 2-pole double throw variety. It comprises a pair of spaced apart contacts 177ᵃ and 177ᵇ, an opposed pair of spaced apart contacts 177ᶜ and 177ᵈ and a movably mounted bridge member 177ᵉ. The bridge member 177ᵉ is operatively connected to the central portion of a lever 177ᶠ. One end of this lever is hinged or pivoted and the other end is in the form of a handle. A compression spring 177ᵍ is applied to the lever 177ᶠ so that it is urged outwards into a position wherein it maintains the bridge member 177ᵉ in engagement or bridging relation with the contacts 177ᶜ and 177ᵈ. When the lever is shifted inwards the bridge member 177ᵉ is shifted out of bridging relation with the contacts 177ᶜ and 177ᵈ into contact or bridging relation with the contacts 177ᵃ and 177ᵇ. A compression spring 177ʰ is located adjacent the handle of the lever and serves so to retard inward shift of the lever as to produce a lag or delay in connection with shift of the bridge member 177ᵉ into bridging relation with the contacts 177ᵃ and 177ᵇ. The contact 176ᵇ of the limit switch 176 is connected to the contact 177ᵃ of the starter switch 177 by a conductor 196. The contact 177ᵇ of the starter switch is connected to the contact 184ᵃ of the switch 184 by a conductor 197. The other contact of the switch 184, i. e., the contact 184ᵇ, is connected by a conductor 198 to the conductor 196 between the contacts 176ᵇ and 177ᵃ. A conductor 199 extends between and serves to connect the contact 184ᵃ of the switch 184 and the contact 183ᵃ of the switch 183. When the lever 177ᶠ is shifted inwards in connection with starting of the lathe it causes the bridge member 177ᵉ to bridge the contacts 177ᵃ and 177ᵇ. As soon as these two contacts are bridged the solenoid 190 is energized as the result of the establishment of the following circuit: line 178, conductor 194, coil 191, conductor 195, normally closed limit switch 176, conductor 196, conductor 197, conductor 199 and line 180. As soon as the solenoid 190 is energized it shifts the rod 188 so as to close the switches 181, 182, 183 and 184. As soon as the switches 181, 182 and 183 are closed the electric motor 13 is set into operation as the result of the 3-phase motor circuit. The conductor 198 and the switch 184 constitute a holding circuit for maintaining the solenoid 190 energized after the lever 177ᶠ is released and while the limit switch 176 is in its closed position. As soon as the lever 177ᶠ is released the spring 177ᵍ urges it outwards and results in the bridge member 177ᵉ moving out of bridging relation with the contacts 177ᵃ and 177ᵇ into bridging relation with the contacts 177ᶜ and 177ᵈ. When the bridge member 177ᵉ is out of bridging relation with the contacts 177ᵃ and 177ᵇ as the result of release of the lever 177ᶠ, the solenoid 190 remains energized because of the holding circuit which is established between the conductor 196 and the line 180, such holding circuit consisting of the conductor 198, the switch 184 and the conductor 199. When the tool carrying plunger 15 reaches the end of its cutting stroke the limit switch 176 is opened by the finger 193 with the result that the circuit for the solenoid 190 is broken and the switches 181, 182, 183 and 184 are opened by the action of the tension spring 189. Opening of the switches 181, 182 and 183 results in stoppage of the electric motor 13. Return of the limit switch 176 in connection with retraction of the plunger 15 does not result in the solenoid 190 again being energized because once the solenoid is de-energized as the result of opening of the limit switch the holding circuit consisting of the conductor 198, switch 184 and conductor 199 is broken. If desired a normally closed emergency stop switch 200 is included in the conductor 196 and makes it possible to stop the lathe at any time. The contact 177ᵈ of the starter switch 177 is connected to the line 180 by a conductor 201. The contact 177ᶜ of the starter switch is connected to one end of the coil 123 of the solenoid valve member 114 by way of a conductor 202. The other end of the coil 123 is connected to a terminal 203. A conductor 204 is connected to the conductor 202 and leads to and is connected to one end of the coil 68 of the solenoid part of the solenoid valve 62. The other end of the coil 68 is connected to the terminal 203 by a conductor 205. A conductor 206 extends between and connects the terminal 203 and the line 179. When the lever 177ᶠ of the starter switch 177 is shifted forwards to effect starting of the lathe the bridge member 177ᵉ is shifted out of bridging relation with the contacts 177ᶜ and 177ᵈ. This serves to break the circuits for the solenoid parts of the valves 62 and 114 with the result that such valves close. As hereinbefore described, closing of the valve 62 results in forward shift of the centering pin 14 and closure of the valve 114 results in the tool carrying plunger 15 being shifted toward the electric motor for plug cutting purposes. The plunger is shifted toward the motor because inward shift of the lever 177ᶠ effects closing of the 3-phase circuit for the motor 13 and the motor operates to drive the gear pump 96. When the lever 177ᶠ is released after starting of the lathe the contacts 177ᶜ and 177ᵈ are bridged by the bridge member 177ᵉ. In order to prevent such bridging of the contacts 177ᶜ and 177ᵈ from energizing the solenoid parts of the solenoid valves 62 and 114 while the motor 13 is in operation a switch 207 and a solenoid 208 are provided. The switch 207 is included in the conductor 206. It is of the normally closed type and comprises a pair of contacts 207ᵃ and 207ᵇ and a bridge member 207ᶜ. The bridge member 207ᶜ is normally held in engagement or bridging relation with the two contacts 207ᵃ and 207ᵇ by a tension spring 207ᵈ. The solenoid 208 serves to hold the switch 207 in its open position during operation of the electric motor 13. It comprises a coil 209 and an armature 210. One end of the coil 210 is connected by a conductor 211 to the conductor 185. The other end of the coil 210 is connected by a conductor 212 to the conductor 186. When current is supplied to the motor 13 as the result of closure of the 3-phase motor circuit the solenoid 209 is energized and the armature 210 operates to open the switch 207. As soon as the motor 13 stops as the result of opening of the limit switch 176 at the end of the cutting stroke of the tool carrying plunger 15 the solenoid 208 is de-energized with the result that the switch 207 closes and completes the circuits for the solenoid parts of the solenoid valves 62 and 114.

The solenoid 39 of the solenoid type brake 37 is supplied with current by way of a pair of conductors 213 and 214. The conductor 213 is connected to the conductor 185 and the conductor 214 is connected to the conductor 186. When current is supplied to the motor 13 the solenoid 39 of the solenoid type brake 37 is energized and operates to release the brake shoe 38. Stoppage of current to the motor 13 results in the solenoid 39 being de-energized with the resultant application of the brake shoe 38 to the outer end of the armature shaft 20 of the motor 13.

*Operation*

Assuming that the 3-phase current supply 174 is in connected relation with a current source the operation of the lathe is as follows:

As a preliminary step the lathe operator manipulates the plug *p* so as to bring the polygonal lug at the large end thereof into the slot 35 in the chuck 34. After this manipulation the operator releases the plug with the result that the plug drops downwards until the reduced externally threaded nut receiving stem at its small end comes in seated relation with the notch defining portion of the upstanding plate 74 on the depending member 73 of the bracket 72. After the plug is in place the operator shifts inwards the lever 177$^f$ of the starter switch 177. During the initial portion of the inward shift of the lever the bridge member 177$^e$ is shifted out of engagement or bridging relation with the contacts 177$^c$ and 177$^d$. This results in stoppage of current through the circuits for the solenoid parts of the solenoid valves 62 and 114. As soon as such circuits are broken the two valves automatically close as hereinbefore described. Closing of the solenoid valve 62 results in air under pressure building up within the upper portion of the chamber 45 and causing the oil in the lower portion of the chamber to flow into the socket 49 via the duct 56. The oil that enters the socket forces the centering pin 14 towards the electric motor and results in the point 53 on the front end of the centering pin entering the tapered or conical socket in the externally threaded reduced stem of the small end of the plug *p*. As the point 53 enters such socket it cams the small end of the plug upwards and also laterally in the direction of the cutting tool. This serves properly to position the plug *p* for cutting. During the initial part of the inward shift of the lever 177$^f$ of the starter switch 177 the solenoid valve 114 closes, as hereinbefore pointed out. Closing of the valve does not, however, result in sliding movement of the plunger towards the motor because at the time that the valve is closed the gear pump 96 is not in operation. When the lever 177$^f$ of the starter switch 177 is shifted further inwards against the force of the compression spring 177$^h$ it causes the bridge member 177$^e$ to bridge the contacts 177$^a$ and 177$^b$. Bridging of these two contacts by the bridge member 177$^e$ results in release of the solenoid brake 37 and starting of the motor 13. As soon as the motor starts it operates to drive the chuck 34 for plug rotating purposes and also sets the pump 96 in operation. The pump immediately upon starting thereof draws oil from the chamber 46 via the branch pipe 110 and the pipe section 109 and forces the oil under pressure into the interiors of the members 77 and 78 via the pipe 102. Because the solenoid valve 114 is closed the oil that is introduced into the interiors of the members 77 and 78 builds up pressure and forces the plunger 15 towards the motor. It is contemplated that as soon as the motor 13 is placed in operation that the operator will release the lever 177$^f$ of the starter switch 177. As heretofore pointed out, release of this lever does not interrupt the flow of current to the electric motor 13 because of the action of the holding circuit consisting of the conductor 198, switch 184 and conductor 199. Furthermore release of the lever 177$^f$ does not energize the solenoid parts of the solenoid valves 62 and 114 because as soon as the electric motor 13 starts the solenoid 208 is energized and operates, as hereinbefore described, to open the normally closed switch 207 in the conductor 206. During sliding movement of the plunger 15 towards the motor the cutting edge 93 of the tool traverses the side surface of the cock plug *p* and serves to provide the plug with the desired truly tapered or conical exterior side surface. As the plunger approaches the end of its cutting stroke the slide block 147 moves into engagement with the enlarged head 146 at the front end of the rod 145 and shifts the spool type valve member 126 on the retarding valve 112 into its closed position. At the end of the cutting stroke of the plunger the finger 193 opens the limit switch 176, as hereinbefore described. Opening of the limit switch 176 causes the circuit for the solenoid 190 to be broken. Interruption of the flow of current through the circuit for the solenoid 190 results in opening of the switches 181, 182, 183 and 184. As soon as these four switches are opened the electric motor 13 stops and the solenoid 208 becomes de-energized. As soon as the last mentioned solenoid becomes de-energized the switch 207 closes with the result that the solenoid parts of the solenoid valves 62 and 114 are energized and result in opening of such valves. As soon as the valve 62 opens air under pressure in the upper portion of the chamber 45 is released and the compression spring 54 operates to retract the centering pin 14. The centering pin retracts before there is any appreciable retraction of the plunger 15 because of the action of the retarding valve 112. Retraction of the centering pin results in the small end of the cut or surfaced plug shifting downwards and away from the cutting tool into a position wherein the plug is out of cutting relation or contact with the cutting edge of the tool 91. Opening of the solenoid valve 62, in addition to resulting in retraction of the centering pin 14, also results in the nozzle 71 directing a jet of air downwards against the point of the retracted centering pin so as to clear such point of any cuttings or other foreign particles which would preclude it from functioning properly in connection with the subsequent operation of the lathe. The initial part of the retractile stroke of the plunger is extremely slow because of the closed position of the spool type valve member 126. When the plunger is retracted sufficiently by the spring 85 to result in opening of the spool type valve member 126 by the spring 141 the retarding valve 112 opens and the oil in the interiors of the members 77 and 78 is released so that it flows back into the chamber 46 via the pipe section 106, the casing 117 of the solenoid valve 114, the pipe section 107 and the branch pipe 110. As soon as there is a free flow of oil from the interiors of the members 77 and 78 the compression spring 85 effects quick and complete retraction of the plunger 15. When the plunger is in its fully retracted position the cut or surfaced plug *p* is removed from the chuck 34 and the upstanding plate 74, and the lathe is in readiness for another cutting operation. If it is desired to increase the amount of taper of the side surface of the plug p the cap screws 23 are loosened and the bed plate 21 together with the motor 13 is shifted away from the bracket 31. Such adjustment results in the centering pin 36 of the chuck 34 being shifted laterally with respect to the point on the front end of the centering pin 14. If it is desired to decrease the amount of taper of the side surface of the plug p the motor 13 is adjusted towards the bracket 31.

The herein described lathe is essentially simple in design and is characterized by high speed of operation and efficiency. It is in the form of a compact unit and is capable of being produced and operated at an extremely low cost. Because the lathe includes automatic means for lubricating the plunger and cylinder and the parts that are associated therewith the lathe as a whole has exceptionally long life.

Whereas the lathe has been described as being primarily designed for use in providing a cock plug with a tapered external side surface it is to be understood that it may be used in other capacities, that is, in surfacing other parts or articles. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A lathe designed to cut the surface of a work piece and comprising a supporting structure, an electric motor mounted on said structure, a chuck connected for drive by the motor and adapted to support one end of and to drive the work piece, a centering pin positioned in opposed relation with the chuck and mounted on the supporting structure so that it is movable towards the chuck into a position wherein it serves to support the other end of the work piece and away from the chuck into a work piece releasing position, a cylinder on the supporting structure disposed at one side of, and substantially in parallel relation with, the centering pin and having the end thereof nearer the motor open and its other end closed, a plunger having one end thereof slidably mounted in the cylinder and its other end provided with a cutting tool, and adapted when slid outwards in the direction of the chuck to have the tool traverse the work piece and effect cutting thereof, switch controlled means for supplying electric current to the motor, a rotary pump connected for drive by the motor and operative when driven to deliver fluid under pressure into the cylinder to cause the plunger to slide towards the motor, means for automatically interrupting the flow of electric current to the motor when the plunger reaches the end of its cutting stroke, means for automatically venting the cylinder when said plunger reaches the end of its cutting stroke, and means for retracting the plunger upon stoppage of the motor and venting of the cylinder.

2. A lathe designed to cut the surface of a work piece and comprising a supporting structure, an electric motor mounted on said structure and provided on one end of the armature shaft thereof with a chuck adapted to support one end of the work piece and also to drive said work piece in response to operation of the motor, a centering pin positioned in opposed relation with the chuck and mounted on the supporting structure so that it is movable towards the chuck into a position wherein it serves to support the other end of the work piece and away from the chuck into a work piece releasing position, a cylinder on the supporting structure disposed at one side of, and substantially in parallel relation with, the centering pin and having the end thereof nearer the motor open and its other end closed, a plunger having one end thereof slidably mounted in the cylinder and its other end provided with a cutting tool, and adapted when slid outwards in the direction of the chuck to have the tool traverse the work piece and effect cutting thereof, switch controlled means for supplying electric current to the motor, a gear pump connected for drive by the motor and operative when driven to deliver liquid under pressure into the cylinder and cause the plunger to slide towards the motor, means for automatically interrupting the flow of electric current to the motor when the plunger reaches the end of its cutting stroke, means for automatically venting the cylinder when said plunger reaches the end of its cutting stroke, and spring means for retracting the plunger upon stoppage of the motor and venting of the cylinder.

3. A lathe designed to cut the surface of a work piece and comprising a supporting structure, an electric motor mounted on said structure, a chuck connected for drive by the motor and adapted to support one end of and to drive the work piece, a centering pin positioned in opposed relation with the chuck and mounted on the supporting structure so that it is movable towards the chuck into a position wherein it serves to support the other end of the work piece and away from the chuck into a work piece releasing position, a cylinder on the supporting structure disposed at one side of, and substantially in parallel relation with, the centering pin and having the end thereof nearer the motor open and its other end closed, a plunger having one end thereof slidably mounted in the cylinder and its other end provided with a cutting tool, and adapted when slid outwards in the direction of the chuck to have the tool traverse the work piece and effect cutting thereof, switch controlled means for supplying current to the motor, a pump connected for drive by the motor and operative when driven to deliver fluid under pressure into the cylinder to cause the plunger to slide towards the motor, means for automatically interrupting the flow of current to the motor when the plunger reaches the end of its cutting stroke, means for automatically venting the cylinder when said plunger reaches the end of its cutting stroke, means for retracting the plunger upon stoppage of the motor and venting of the cylinder, means operative automatically upon closing of the switch to move the centering pin into its work piece supporting position, and means for shifting the centering pin into its work piece releasing position upon stoppage of the motor.

4. A lathe designed to cut the surface of a work piece and comprising a supporting structure, an electric motor mounted on said structure and provided on one end of the armature shaft thereof with a chuck adapted to support one end of the work piece and also to drive said work piece in response to operation of said motor, a centering pin positioned in opposed relation with the chuck and mounted on the supporting structure so that it is movable towards the chuck into a position wherein it serves to support the other end of the work piece and away from the chuck into a work piece releasing position, a cylinder on the supporting structure disposed at one side of, and substantially in parallel relation with, the centering pin and having the end thereof nearer the motor open and its other end closed, a plunger having one end thereof slidably mounted in the cylinder and its other end provided with a cutting tool, and adapted when slid outwards in the direction of the chuck to have the tool traverse the work piece and effect cutting thereof, switch controlled means for supplying electric current to the motor, a pump connected for drive by the motor and operative when driven to deliver fluid under pressure to the cylinder to cause the plunger to slide towards the chuck, means for automatically interrupting the flow of electric current to the motor when the plunger reaches the end of its cutting stroke, means for automatically venting the cylinder when said plunger reaches the end of its cutting stroke, and a compression spring in the cylinder for retracting the plunger upon venting of said cylinder.

5. A lathe designed to cut a tapered surface on a work piece and comprising a supporting structure, an electric motor positioned over the structure and provided on one end of the armature shaft thereof with a chuck adapted to support one end of the work piece and also to drive said work piece in response to operation of the motor, a centering pin disposed in opposed relation with the chuck and mounted on the supporting structure so that it is slidable towards the chuck into a position wherein it serves to support the other end of the work piece and away from the chuck into a work piece releasing position, a cylinder on the supporting structure disposed at one side of, and extending at a small acute angle with respect to, the centering pin, and having the end thereof nearer the chuck open and its other end closed, a plunger having one end thereof slidably mounted in the cylinder and its other end provided with a cutting tool, and adapted when slid outwards in the direction of the chuck to have the tool traverse the work piece to effect cutting thereof, a pump connected for drive by the motor and operative when driven to deliver fluid under pressure into the cylinder to cause the plunger to slide towards the chuck, and a common mount for the motor and pump slidably mounted on the supporting structure so as to permit the motor to be adjusted laterally.

6. An apparatus designed to cut a work piece and comprising a supporting structure embodying a tubular, horizontally extending, open ended frame member and a channel beam positioned above, and extending lengthwise of, the top portion of the frame member and having the side flanges thereof extending downwards towards, and connected to, said top portion of said frame member, a power driven chuck positioned over one end of the channel beam and adapted to support one end of and drive the work piece, a centering pin positioned over the other end of the channel beam and in opposed relation with the chuck and mounted so that it is shiftable towards the chuck into a position wherein it serves to support the other end of the chuck and away from the chuck into a work piece releasing position, means at one side of the centering pin for supporting a cutting tool so that it serves to cut the work piece, and an open bottom hopper beneath the chuck and centering pin adapted to receive the cuttings caused by the tool and having the lower end thereof extending through aligned openings in the web of the channel beam and the upper portion of the frame member and adapted to direct the cuttings into the interior of said frame member.

7. A lathe designed to cut a work piece and comprising a supporting structure embodying a tubular, horizontally extending, open ended frame member and a channel beam disposed above, and extending lengthwise of, the upper portion of the frame member and having the side flanges thereof extending downwards towards, and connected to, said upper portion of the frame member and serving to space the web of the beam from said upper portion of the frame member so as to form a space therebetween, a power driven chuck positioned over one end of the beam and adapted to support one end of the work piece and also to drive said work piece, a centering pin positioned over the other end of the channel beam and in opposed relation with the chuck and mounted so that it is movable towards the chuck into a position wherein it serves to support the other end of the work piece and away from the chuck into a work piece releasing position, a cylinder disposed at one side of, and in substantially parallel relation with, the centering pin and having the end thereof nearer the chuck open and its other end closed, a plunger having one end thereof slidably mounted in the cylinder and its other end provided with a cutting tool, and adapted when slid outwards in the direction of the chuck to have the tool traverse the work piece and effect cutting thereof, and means for supplying liquid under pressure into the cylinder in order to cause the plunger to slide towards the chuck, embodying a power driven pump adjacent said one end of the channel beam and a pipe extending through said space and having one end thereof connected to the pump and its other end in communication with the cylinder.

8. A lathe designed to cut a work piece and comprising a supporting structure embodying a tubular, horizontally extending, open ended frame member and a channel beam disposed above, and extending lengthwise of, the upper portion of the frame member and having the side flanges thereof extending downwards towards, and connected to, said upper portion of the frame member and serving to space the web of the beam from said upper portion of the frame member so as to form a space therebetween, a power driven chuck positioned over one end of the beam and adapted to support one end of the work piece and also to drive said work piece, a centering pin positioned over the other end of the channel beam and in opposed relation with the chuck and mounted so that it is movable towards the chuck into a position wherein it serves to support the other end of the work piece and away from the chuck into a work piece releasing position, a cylinder disposed at one side of, and in substantially parallel relation with, the centering pin and having the end thereof nearer the chuck open and its other end closed, a plunger having one end thereof slidably mounted in the cylinder and its other end provided with a cutting tool, and adapted when slid outwards in the direction of the chuck to have the tool traverse the work piece and effect cutting thereof, means for supplying liquid under pressure into the cylinder in order to cause the plunger to slide towards the chuck, embodying a power driven pump adjacent said one end of the channel beam, and a pipe extending through said space and having one end thereof connected to the pump and its other end in communication with the cylinder, and an open bottom hopper beneath the chuck and centering pin adapted to catch the cuttings caused by the tool and having the lower end thereof extending through aligned openings in the web of the channel beam and the upper portion of the frame member and adapted to direct such cuttings into the interior of the frame member.

9. An apparatus designed to cut a work piece and comprising a supporting structure, a power driven chuck positioned over the structure and adapted to support one end of and drive the work piece, a housing mounted on the supporting structure in opposed relation with the chuck and having in substantial alignment with the chuck a cylindrical type socket with the end thereof nearer the chuck open and its other end closed, a centering pin slidably mounted in the socket and adapted when slid outwards to engage and support the other end of the work piece, means forming a closed chamber for a limited quantity of liquid, means establishing communication between the inner end of the socket and the bottom of the chamber, means for delivering a gas under pressure into the upper portion of the chamber in order to cause the liquid to flow from the chamber into the socket and cause the centering pin to move outwards into its work piece supporting position, valve controlled means for venting said upper portion of the chamber, means for automatically retracting the centering pin upon venting of said upper portion of said chamber, and means at one side of the centering pin for supporting a cutting tool so that it serves to cut the work piece when the latter is supported by the chuck and centering pin.

10. An apparatus designed to cut a work piece and comprising a supporting structure, a power driven chuck positioned over the structure and adapted to support one end of and drive the work piece, a housing mounted on the supporting structure in opposed relation with the chuck and having a cylinder type socket in substantial alignment with the chuck and the one end thereof nearer the chuck open and its other end closed, and also having beneath the socket a closed chamber and with a partial filling of liquid therein, and a duct extending and establishing communication between the bottom of the chamber and the inner end of the socket, means for delivering a gas under pressure into the upper portion of the chamber in order to cause the liquid to flow from the chamber into the socket and force the centering pin to slide outwards into its work piece supporting position, valve controlled means for venting said upper portion of the chamber, spring means for retracting the centering pin upon venting of said upper portion of the chamber, and means at one side of the centering pin for supporting a cutting tool so that it serves to cut the work piece when the latter is supported by the chuck and centering pin.

11. An apparatus designed to cut a work piece and comprising a supporting structure, a power driven chuck positioned over the structure and adapted to support one end of and rotate the work piece, a housing mounted on the supporting structure in opposed relation with the chuck and having a cylinder type socket in substantial alignment with the chuck and with the end thereof nearer the chuck open and its other end closed, a centering pin slidably mounted in the socket and adapted when slid outwards to engage and support the other end of the work piece, means forming a closed chamber for a limited quantity of liquid, means establishing communication between the bottom of the chamber and the inner end of the socket, a pipe connected to a source of air under pressure, having one end thereof in communication with the upper portion of the chamber, provided at its other end with a valve having the outlet thereof leading to atmosphere, and adapted when the valve is closed to supply air under pressure into the upper portion of the chamber in order to cause the liquid in the chamber to flow into the socket and cause the centering pin to slide outwards into its work piece supporting position, and further adapted when the valve is opened to vent the upper portion of the chamber and permit back flow of the liquid from the socket into the chamber, means for retracting the centering pin upon back flow of the liquid from the socket into the chamber as the result of opening of the valve, and means at one side of the centering pin for supporting a cutting tool so that it serves to cut the work piece when the latter is supported by the chuck and centering pin.

12. An apparatus designed to cut a work piece and comprising a supporting structure, a power driven chuck positioned over the structure and adapted to support one end of and rotate the work piece, a housing mounted on the supporting structure in opposed relation with the chuck, and having a cylindrical socket in substantial alignment with the chuck and with the end thereof nearer the chuck open and its other end closed, a centering pin slidably mounted in the socket and adapted when slid outwards to engage and support the other end of the work piece, a spring in the inner end of the socket for urging the centering pin inwards out of its work piece supporting position, means forming a closed chamber for a limited quantity of liquid, means establishing communication between the bottom of the chamber and the inner end of the socket, a pipe connected to a source of air under pressure, having one end thereof communicating with the upper portion of the chamber, provided at its other end with a valve having the outlet end thereof leading to atmosphere, adapted when the valve is closed to deliver air under pressure into the upper portion of the chamber in order to cause the liquid to flow from the chamber into the socket and cause it to force the centering pin outwards into its work piece supporting position against the force of the spring, and further adapted when the valve is opened to vent said upper portion of the chamber so as to permit back flow of the liquid from the socket to the chamber and retraction of the centering pin by the spring, and means at one side of the centering pin for supporting a cutting tool so that it serves to cut the work piece when the latter is supported by the chuck and centering pin.

13. An apparatus designed to cut a work piece and comprising a supporting structure, a power driven chuck positioned over the structure and adapted to support one end of and rotate the work piece, a housing mounted on the supporting structure in opposed relation with the chuck and having a cylinder type socket in substantial alignment with the chuck and with the end thereof nearer the chuck open and its other end closed, a centering pin slidably mounted in the socket and adapted when slid outwards to engage and support the other end of the work piece, means beneath the socket forming a closed chamber for a limited quantity of liquid, means establishing communication between the bottom of the chamber and the inner end of the socket, a pipe connected to a source of air under pressure, having one end thereof in communication with the upper portion of the chamber, adapted when the valve is closed to supply air under pressure into the upper portion of the chamber in order to cause the liquid in the chamber to flow into the socket and cause the centering pin to slide outwards into its work piece supporting position, and further adapted when the valve is opened to vent the upper portion of the chamber and permit back flow of the liquid from the socket into the chamber, means for retracting the centering pin upon back flow of the liquid from the socket into the chamber as the result of opening of the valve, a pipe having one end thereof connected to the outlet of the valve and its other end arranged so that it faces the outer end of the centering pin when the latter is in its retracted position and adapted when the valve is opened to deliver the air under pressure emanating therefrom against said outer end of the centering pin, and means at one side of the centering pin for supporting a cutting tool so that it serves to cut the work piece when the latter is supported by the chuck and centering pin.

14. A lathe designed to cut the surface of a work piece and comprising a supporting structure, a power driven chuck positioned over the structure and adapted to support one end of and drive the work piece, a housing mounted on the supporting structure in opposed relation with the chuck and having a cylinder type socket in substantial alignment with the chuck and with the end thereof nearer the chuck open and its other end closed, a centering pin slidably mounted in the socket and adapted when slid outwards to engage and support the other end of the work piece, means forming a closed chamber for a limited quantity of liquid, means establishing communication between the bottom of the chamber and the inner end of the socket, means for delivering a gas under pressure into the upper portion of the chamber in order to cause the liquid to flow from the chamber into the socket and force the centering pin to move outwards into its work piece supporting position, means including a valve for venting said upper portion of the chamber, means for retracting the centering pin upon opening of the valve, an element at one side of the centering pin mounted to slide rectilinearly to and from the chuck, provided with a cutting tool, and adapted when slid towards the chuck to have the tool traverse the work piece and effect cutting thereof, and means for automatically opening the valve when the element reaches the end of its cutting stroke.

15. A lathe designed to cut the surface of a work piece and comprising a supporting structure, a power driven chuck positioned over the structure and adapted to support one end of and rotate the work piece, a housing mounted on the supporting structure in opposed relation with the chuck and having a cylindrical socket in substantial alignment with the chuck and with the end thereof nearer the chuck open and its other end closed, a centering pin slidably mounted in the socket and adapted when slid outwards to engage and support the other end of the work piece, a spring in the inner end of the socket for urging the centering pin inwards out of its work piece supporting position, means beneath the socket forming a closed chamber for a limited quantity of liquid, means establishing communication between the bottom of the chamber and the inner end of the socket, a pipe connected to a source of air under pressure, having one end thereof communicating with the upper portion of the chamber, provided at its other end with a valve having the outlet end thereof leading to atmosphere, adapted when the valve is closed to deliver air under pressure into the upper portion of the chamber in order to cause the liquid to flow from the chamber into the socket and force the centering pin outwards into its work piece supporting position against the force of the spring, and further adapted when the valve is opened to vent said upper portion of the chamber so as to permit back flow of the liquid from the socket to the chamber and retraction of the centering pin by the spring, a cylinder disposed at one side of, and in substantially parallel relation with, the centering pin and having the end thereof nearer the chuck open and its other end closed, a plunger having one end thereof slidably mounted in the cylinder and its other end provided with a cutting tool, and adapted when slid outwards in the direction of the chuck to have the tool traverse the work piece and effect cutting thereof, means for supply fluid under pressure into the cylinder to cause the plunger to slide towards the chuck, means including a valve for venting the cylinder, means for retracting the plunger upon venting of the cylinder, and means for automatically and simultaneously opening the two valves when the plunger reaches the end of its cutting stroke.

16. A lathe designed to cut the surface of a work piece and comprising a supporting structure, a power driven chuck positioned over the structure and adapted to support one end of and drive the work piece, a housing mounted on the supporting structure in opposed relation with the chuck and having in substantial alignment with the chuck a cylinder type socket with the end thereof nearer the chuck open and its other end closed, a centering pin slidably mounted in the socket and adapted when slid outwards to engage and support the other end of the work piece, means beneath the socket forming a closed chamber for a limited quantity of liquid, means establishing communication between the inner end of the socket and the bottom of the chamber, means for delivering a gas under pressure into the upper portion of the chamber in order to cause the liquid to flow from the chamber into the socket and cause the centering pin to move outwards into its work piece supporting position, means including a normally closed solenoid valve for venting said upper portion of the chamber, means for retracting the centering pin upon opening of the valve and resultant venting of the upper portion of said chamber, a cylinder disposed at one side of, and in substantially parallel relation with, the centering pin and having the end thereof nearer the chuck open and its other end closed, a plunger having one end thereof slidably mounted in the cylinder and its other end provided with a cutting tool, and adapted when slid outwards in the direction of the chuck to have the tool traverse the work piece and effect cutting thereof, means for supplying fluid under pressure into the cylinder to cause the plunger to slide towards the chuck, means including a normally closed solenoid valve for venting the cylinder, means for retracting the plunger upon opening of the last mentioned valve and resultant venting of the cylinder, and means for supplying current to the two valves when the plunger reaches the end of its cutting stroke in order to open such valves.

17. A lathe designed to cut the surface of a work piece and comprising a supporting structure, a power driven chuck positioned over the structure and adapted to suport one end of and drive the work piece, means mounted on the supporting structure in opposed relation with the chuck for releasably supporting the other end of the work piece, a housing on the supporting structure in opposed relation with the chuck and having formed therein a cylinder with one end thereof open and extending in the direction of the chuck and its other end closed, and also having formed therein and beneath the cylinder a vented chamber for a body of liquid, a power driven pump mounted on the supporting structure and having the inlet thereof connected to the chamber to receive liquid from the chamber and its outlet connected to the cylinder, and adapted during drive thereof to deliver liquid under pressure into the cylinder and cause the plunger to slide towards the chuck, a vent pipe having one end thereof connected to the cylinder and its other end in communication with the chamber, and having a valve therein, means for retracting the plunger upon venting of the cylinder due to opening of the valve, and means for automatically opening said valve when the plunger reaches the end of its cutting stroke.

18. A lathe designed to cut the surface of a work piece and comprising a supporting structure, a power driven chuck positioned over the structure and adapted to support one end of and drive the work piece, means on the supporting structure in opposed relation with the chuck for releasably supporting the other end of the work piece, a cylinder mounted on the supporting structure and at one side of the releasable supporting means and having one end thereof open facing in the direction of the chuck and its other end closed, a plunger having one end thereof slidably mounted in the cylinder and its other end provided with a cutting tool, and adapted when slid outwards in the direction of the chuck to have the tool traverse the work piece and effect cutting thereof, means forming a chamber for a supply of liquid, a power driven pump having the inlet thereof connected to the chamber and its outlet connected to the cylinder, and adapted when driven to deliver liquid under pressure into the cylinder and cause the plunger to slide towards the chuck, a vent pipe having one end thereof connected to the cylinder and its other end in communication with the chamber, and provided therein with a normally closed solenoid valve, means for retracting the plunger upon venting of the cylinder due to opening of the valve, and automatic means for supplying current to the valve when the plunger reaches the end of its cutting stroke in order to open said valve.

19. A lathe designed to cut the surface of a work piece and comprising a supporting structure, an electric motor mounted on said structure, means for supplying current to the motor, a chuck connected for drive by the motor and adapted to support one end of and drive the work piece, means mounted on the structure in opposed relation with the chuck for releasably supporting the other end of the work piece, a cylinder mounted on the supporting structure at one side of the releasable supporting means and having one end thereof open and facing in the direction of the chuck and its other end closed, a plunger having one end thereof slidably mounted in the cylinder and its other end provided with a cutting tool, and adapted when slid outwards in the direction of the chuck to have the tool traverse the work piece and effect cutting thereof, means forming a chamber for a supply of liquid, a pump connected for drive by the motor, having the inlet thereof connected to receive liquid from the chamber and its outlet connected to the cylinder, and adapted when driven to deliver liquid under pressure into the cylinder and cause the plunger to slide towards the chuck, a vent pipe having one end thereof connected to the cylinder and its other end in communication with the chamber, and provided with a normally closed solenoid valve, means for retracting the plunger upon venting of the cylinder due to opening of the valve, means for automatically supplying current to the valve from the current supplying means when said plunger reaches the end of its cutting stroke.

20. A lathe designed to cut the surface of a work piece and comprising a supporting structure; a power driven chuck positioned over the structure and adapted to support one end of and drive the work piece; a housing mounted on the supporting structure in opposed relation with the chuck and having a cylinder type socket in substantial alignment with the chuck and with the end thereof nearer the chuck open and its other end closed, a closed chamber beneath the socket for a limited quantity of liquid; a duct between the bottom of the chamber and the inner end of the socket, a cylinder at one side of the socket having one end thereof open and facing the chuck and its other end closed, and a second chamber disposed beneath the cylinder and adapted to retain a supply of liquid; a centering pin slidably mounted in the socket and adapted when slid outwards to engage and support the other end of the work piece, means for delivering a gas under pressure into the upper portion of the closed chamber in order to cause the liquid therein to flow into the socket via the duct and cause the pin to move outwards into its work piece supporting position; means including a valve for venting said upper portion of the closed chamber; means for retracting the centering pin upon opening of the valve and resultant venting of the upper portion of said closed chamber; a plunger having one end thereof slidably mounted in the cylinder and its other end provided with a cutting tool, and adapted when slid outwards in the direction of the chuck to have the tool traverse the work piece and effect cutting thereof; a power driven pump having the inlet thereof connected to receive liquid from the second chamber and its outlet connected to the cylinder, and adapted when driven to deliver liquid under pressure into the cylinder and cause the plunger to slide towards the chuck; a vent pipe having one end thereof connected to the cylinder and its other end in communication with said second chamber, and provided with a valve; means for retracting the plunger upon venting of the cylinder due to opening of the last mentioned valve; and means for automatically opening the two valves when the plunger reaches the end of its cutting stroke.

21. A lathe designed to cut the surface of a work piece and comprising a supporting structure, an electric motor mounted on said structure, means for supplying current to the motor, a chuck connected for drive by the motor and adapted to support one end of and drive the work piece, means mounted on the supporting structure in opposed relation with the chuck and forming a cylinder type socket in substantial alignment with the chuck and with the end thereof nearer the chuck open and its other end closed, a centering pin slidably mounted in the socket and adapted when slid outwards towards the chuck to engage and support the other end of the work piece, means forming a closed chamber for a limited quantity of liquid, means for establishing communication between the bottom of the chamber and the inner end of the socket, means for delivering a gas under pressure into the upper portion of the chamber in order to cause the liquid to flow from the chamber into the socket and cause the centering pin to move outwards into its work piece supporting position, means including a valve for venting said upper portion of the chamber, means for retracting the centering pin upon opening of the valve and resultant venting of the upper portion of the chamber, a cylinder mounted on the supporting structure at one side of the socket and having one end thereof facing in the direction of the chuck and its other end closed, a plunger having one end thereof slidably mounted in the cylinder and its other end provided with a cutting tool, and adapted when slid outwards in the direction of the chuck to have the tool traverse the work piece and effect cutting thereof, means forming a second chamber for a supply of liquid, a pump connected for drive by the motor, having the inlet thereof connected to receive liquid from the second chamber and its outlet connected to the cylinder, and adapted when driven to deliver liquid under pressure into the cylinder and cause the plunger to slide towards the chuck, a vent pipe having one end thereof connected to the cylinder and its other end in communication with the second chamber and provided with a valve, means for retracting the plunger upon venting of the cylinder due to opening of the last mentioned valve, means for automatically interrupting the flow of curent to the motor when the plunger reaches the end of its cutting stroke, and means for automatically opening the two valves when said plunger reaches the end of its cutting stroke.

22. A lathe designed to cut the surface of a work piece and comprising a supporting structure, an electric motor mounted on said structure, means for supplying current to the motor, a chuck connected for drive by the motor and adapted to support one end of and drive the work piece, means mounted on the supporting structure in opposed relation with the chuck and forming a cylinder type socket in substantial alignment with the chuck and with the end thereof nearer the chuck open and its other end closed, a centering pin slidably mounted in the socket and adapted when slid outwards towards the chuck to engage and support the other end of the work piece, means forming a closed chamber for a limited quantity of liquid, means for establishing communication between the bottom of the chamber and the inner end of the socket, means for delivering a gas under pressure into the upper portion of the chamber in order to cause the liquid to flow from the chamber into the socket and cause the centering pin to move outwards into its work piece supporting position, means including a normally closed solenoid valve for venting said upper portion of the chamber, means for retracting the centering pin upon opening of the valve and resultant venting of the upper portion of the chamber, a cylinder mounted on the supporting structure at one side of the socket and having one end thereof facing in the direction of the chuck and its other end closed, a plunger having one end thereof slidably mounted in the cylinder and its other end provided with a cutting tool, and adapted when slid outwards in the direction of the chuck to have the tool traverse the work piece and effect cutting thereof, means forming a second chamber for a supply of liquid, a pump connected for drive by the motor, having the inlet thereof connected to receive liquid from the second chamber and its outlet connected to the cylinder, and adapted when driven to deliver liquid under pressure into the cylinder and cause the plunger to slide towards the chuck, a vent pipe having one end thereof connected to the cylinder and its other end in communication with the second chamber and provided with a normally closed solenoid valve, means for retracting the plunger upon venting of the cylinder due to opening of the last mentioned valve, means for automatically interrupting the flow of current to the motor when the plunger reaches the end of its cutting stroke, and means for supplying current to the two valves when the plunger reaches the end of its cutting stroke in order to open said valves.

23. A lathe designed to cut the surface of a work piece and comprising a supporting structure, a power driven chuck positioned over the structure and adapted to support one end of and drive the work piece, means mounted on the structure in opposed relation with the chuck for releasably supporting the other end of the work piecse, a cylinder mounted on the supporting structure at one side of the releasable supporting means and having one end thereof open and facing in the direction of the chuck, a plunger having one end thereof slidably mounted in the cylinder and its other end provided with a cutting tool, and adapted when slid in one direction relatively to the chuck to have the tool traverse the work piece and effect cutting thereof, means for reciprocating the plunger, a single guide bar disposed adjacent said other end of the plunger and having at the inner side thereof a flat lapped face in true parallel relation with the axis of the cylinder, and a laterally extending guide block mounted on said other end of the plunger and having a flat lapped outer face arranged so that it is in sliding engagement with the flat lapped face of the guide bar and coacts with said last mentioned face to guide the plunger during reciprocation truly rectilinearly regardless of any looseness between the plunger and the cylinder.

24. A lathe designed to cut the surface of a work piece and comprising a supporting structure, a power driven chuck positioned over the structure and adapted to support one end of and drive the work piece, means on the structure in opposed relation with the chuck for releasably supporting the other end of the work piece, a housing mounted on the supporting structure adjacent said releasable supporting means and provided at one side of said means with a cylinder having one end thereof open and facing in the direction of the chuck, a plunger having one end thereof slidably mounted in the cylinder and its other end provided with a cutting tool, and adapted when slid in one direction relatively to the chuck to have the tool traverse the work piece and effect cutting thereof, means for reciprocating the plunger, an elongated guide bar adjacent said other end of the plunger having one end thereof connected to the housing and its other end free projecting in the direction of the chuck and provided at the inner side thereof with a lapped face in true parallel relation with the axis of the cylinder, and a laterally extending guide block mounted on said other end of the plunger and having a flat lapped outer face arranged so that it is in sliding engagement with the lapped face of said other end of the guide bar and coacts therewith to guide the plunger during reciprocation thereof truly rectilinearly regardless of any looseness between the plunger and the cylinder.

25. A lathe designed to cut the surface of a work piece and comprising a supporting structure, a power driven chuck positioned over the structure and adapted to support one end of and drive the work piece, means on the structure in opposed relation with the chuck for releasably supporting the other end of the work piece, a cylinder mounted on the supporting structure at one side of the releasable supporting means and having one end thereof open and facing in the direction of the chuck and its other end closed, a plunger having one end thereof slidably mounted in the cylinder and its other end provided with a cutting tool, and adapted when slid outwards in the direction of the chuck to have the tool traverse the work piece and effect cutting thereof, a power driven pump operative when driven to supply oil under pressure into the cylinder and cause the plunger to slide outwards, a guide bar positioned adjacent said other end of the plunger and extending in parallel relation with the axis of the cylinder, a guide block mounted on said other end of the plunger and arranged so that it engages the guide bar slidably and coacts therewith to guide the plunger during sliding movement thereof truly rectilinearly regardless of any looseness between the plunger and the cylinder, and means for supplying oil from the cylinder to the surfaces of the guide bar and block that are in sliding engagement in order to lubricate such surfaces.

26. A lathe designed to cut the surface of a work piece and comprising a supporting structure, a power driven chuck positioned over the structure and adapted to support one end of and drive the work piece, means on the structure in opposed relation with the chuck for releasably supporting the other end of the work piece, a cylinder mounted on the supporting structure at one side of the releasable supporting means and having one end thereof open and facing in the direction of the chuck and its other end closed, a plunger having one end thereof slidably mounted in the cylinder and its other end provided with a cutting tool, and adapted when slid outwards in the direction of the chuck to have the tool traverse the work piece and effect cutting thereof, a power driven pump operative when driven to supply oil under pressure into the cylinder and cause the plunger to slide outwards, a guide bar positioned adjacent said other end of the plunger and extending in parallel relation with the axis of the cylinder, a guide block mounted on said other end of the plunger and arranged so that it engages the guide bar slidably and coacts therewith to guide the plunger during sliding movement thereof truly rectilinearly regardless of any looseness between the plunger and the cylinder, and means comprising a longitudinal duct in the plunger and a passage in the guide block for supplying oil from the cylinder to the surfaces of the guide block and bar that are in sliding engagement with one another in order to lubricate such surfaces.

27. A lathe designed to cut the surface of a work piece and comprising a supporting structure, a power driven chuck positioned over the structure and adapted to support one end of and drive the work piece, means on the supporting structure in opposed relation with the chuck and forming a cylinder type socket in substantial alignment with the chuck and with the end thereof nearer the chuck open and its other end closed, a spring retracted centering pin slidably mounted in the socket and adapted when slid outwards against the force of the spring to engage and support the other end of the work piece, means for supplying fluid under pressure to the socket in order to effect outward sliding of the pin, means for venting the socket including a valve, a cylinder on the supporting structure disposed at one side of, and substantially in parallel relation with, the socket and having the end thereof nearer the chuck open and its other end closed, a spring retracted plunger having one end thereof slidably mounted in the cylinder and its other end provided with a cutting tool, and adapted when slid outwards in the direction of the chuck to have the tool traverse the work piece and effect cutting thereof, means for delivering fluid under pressure into the cylinder to cause the plunger to slide outwards, a vent pipe leading from the cylinder and provided with a control valve therefor, means for automatically opening the two valves when the plunger reaches the end of its cutting stroke, and automatic means for retarding the plunger during the initial part of retractile shift thereof.

28. A lathe designed to cut the surface of a work piece and comprising a supporting structure, a power driven chuck positioned over the structure and adapted to support one end of and drive the work piece, means on the supporting structure in opposed relation with the chuck and forming a cylinder type socket in substantial alignment with the chuck and with the end thereof nearer the chuck open and its other end closed, a spring retracted centering pin slidably mounted in the socket and adapted when slid outwards against the force of the spring to engage and support the other end of the work piece, means for supplying fluid under pressure to the socket in order to effect outward sliding of the pin, means for venting the socket including a valve, a cylinder on the supporting structure disposed at one side of, and substantially in parallel relation with, the socket and having the end thereof nearer the chuck open and its other end closed, a spring retracted plunger having one end thereof slidably mounted in the cylinder and its other end provided with a cutting tool, and adapted when slid outwards in the direction of the chuck to have the tool traverse the work piece and effect cutting thereof, means for delivering fluid under pressure into the cylinder to cause the plunger to slide outwards, a vent pipe leading from the cylinder and provided with a control valve therefor, means for automatically opening the two valves when the plunger reaches the end of its cutting stroke, and automatic means for restricting the flow of fluid under pressure through the vent pipe during the initial part of retractile shift of the plunger.

29. A lathe designed to cut the surface of a work piece and comprising a supporting structure, a power driven chuck positioned over the structure and adapted to support one end of and drive the work piece, means on the supporting structure in opposed relation with the chuck and forming a cylinder type socket in substantial alignment with the chuck and with the end thereof nearer the chuck open and its other end closed, a spring retracted centering pin slidably mounted in the socket and adapted when slid outwards against the force of the spring to engage and support the other end of the work piece, means for supplying fluid under pressure to the socket in order to effect outward sliding of the pin, means for venting the socket including a valve, a cylinder on the supporting structure disposed at one side of, and substantially in parallel relation with, the socket and having the end thereof nearer the chuck open and its other end closed, a spring retracted plunger having one end thereof slidably mounted in the cylinder and its other end provided with a cutting tool, and adapted when slid outwards in the direction of the chuck to have the tool traverse the work piece and effect cutting thereof, means for delivering fluid under pressure into the cylinder to cause the plunger to slide outwards, a vent pipe leading from the cylinder and provided with a control valve therefor, means for automatically opening the two valves when the plunger reaches the end of its cutting stroke, a normally open retarding valve included in the vent pipe and adapted when closed and while the control valve is open to permit of a restricted flow of pressure from the cylinder through said vent pipe, and means whereby the retarding valve is closed when the plunger is at the end of its cutting stroke and is released for opening purposes after the initial part of the retractile stroke of the plunger.

30. A lathe designed to cut the surface of a work piece and comprising a supporting structure, a power driven chuck positioned over the structure and adapted to support one end of and drive the work piece, a housing mounted on the supporting structure in opposed relation with the chuck and provided with a cylinder type socket in substantial alignment with the chuck and with the end thereof nearer the chuck open and its other end closed, and also provided with a cylinder at one side of, and in substantially parallel relation with, the socket and with the end thereof nearer the chuck open and its other end closed, a spring retracted centering pin slidably mounted in the socket and adapted when slid outwards against the force of the spring to engage and support the other end of the work piece, means for supplying fluid under pressure to the socket in order to effect outward sliding of the pin, means for venting the socket for centering pin retracting purposes including a valve, a spring retracted plunger having one end thereof slidably mounted in the cylinder and its other end provided with a cutting tool, and adapted when slid outwards in the direction of the chuck to have the tool traverse the work piece and effect cutting thereof, means for delivering fluid under pressure into the cylinder to cause the plunger to slide outwards, a vent pipe leading from the cylinder and provided with a control valve therefor, means for automatically opening the two valves when the plunger reaches the end of its cutting stroke, a normally open plunger retarding valve included in the vent pipe, mounted on said housing, and adapted when closed while the control valve for the vent pipe is open to permit a restricted flow of fluid under pressure from the cylinder through the vent pipe, and means whereby the retarding valve is closed when the plunger is at the end of its cutting stroke and is released for opening purposes after the initial part of the retractile stroke of the plunger.

31. A lathe designed to cut the surface of a work piece and comprising a supporting structure, a power driven chuck positioned over the structure and adapted to support one end of and drive the work piece, a housing mounted on the supporting structure in opposed relation with the chuck and provided with a cylinder type socket in substantial alignment with the chuck and with the end thereof nearer the chuck open and its other end closed, and also provided with a cylinder at one side of, and in substantially parallel relation with, the socket and with the end thereof nearer the chuck open and its other end closed, a spring retracted centering pin slidably mounted in the socket and adapted when slid outwards against the force of the spring to engage and support the other end of the work piece, means for supplying fluid under pressure to the socket in order to effect outward sliding of the pin, means for venting the socket for centering pin retracting purposes including a valve, a spring retracted plunger having one end thereof slidably mounted in the cylinder and its other end provided with a cutting tool, and adapted when slid outwards in the direction of the chuck to have the tool traverse the work piece and effect cutting thereof, means for delivering fluid under pressure into the cylinder to cause the plunger to slide outwards, a vent pipe leading from the cylinder and provided with a control valve therefor, means for automatically opening the two valves when the plunger reaches the end of its cutting stroke, a normally open plunger retarding valve included in the vent pipe, mounted on said housing, and adapted when closed while the control valve for the vent pipe is open to permit a restricted flow of fluid under pressure from the cylinder through the vent pipe, and means whereby the retarding valve is closed when the plunger is at the end of its cutting stroke and is released for opening purposes after the initial part of the retractile stroke of the plunger, embodying an element connected to, and extending radially from, said one end of the plunger and projecting through a slot that is formed in the housing and communicates with, and extends longitudinally of, the cylinder.

32. A lathe designed to cut the surface of a work piece and comprising a supporting structure, a power driven chuck positioned over the structure and adapted to support one end of and drive the work piece, means mounted on the structure in opposed relation with the chuck for releasably supporting the other end of the work piece, a housing adjacent the releasable supporting means, mounted on the structure and provided with a cylinder with one end thereof open and facing in the direction of the chuck and its other end closed, and also provided with means forming a slot type slideway in communication with, and extending lengthwise of, the central portion of the cylinder, a plunger having one end thereof slidably mounted in the cylinder and its other end provided with a cutting tool, and adapted when slid outwards in the direction of the chuck to have the tool traverse the work piece and effect cutting thereof, a pump for delivering fluid under pressure into the inner end of the cylinder to force the plunger towards the chuck, means including a valve for venting the inner end of the cylinder, means for retracting the plunger when said inner end of the cylinder is vented as a result of opening of the valve, and a slide block connected to the central portion of the plunger and mounted to slide in the slideway and coact therewith to prevent turning of the plunger.

33. A lathe designed to cut the surface of a work piece and comprising a supporting structure, a power driven chuck positioned over the structure and adapted to support one end of and drive the work piece, means mounted on the structure in opposed relation with the chuck for releasably supporting the other end of the work piece, a housing adjacent the releasable supporting means, mounted on the structure and provided with a cylinder with one end thereof open and facing in the direction of the chuck and its other end closed, and also provided with means forming a slot type slideway in communication with, and extending lengthwise of, the central portion of the cylinder, a plunger having one end thereof slidably mounted in the cylinder and its other end provided with a cutting tool, and adapted when slid outwards in the direction of the chuck to have the tool traverse the work piece and effect cutting thereof, a pump for delivering oil under pressure into the inner end of the cylinder to force the plunger towards the chuck, means including a valve for venting the inner end of the cylinder, means for retracting the plunger when said inner end of the cylinder is vented as a result of opening of the valve, a slide block connected to the central portion of the plunger and mounted to slide in the slideway and coact therewith to prevent turning of the plunger, and means for supplying oil from the inner end of the cylinder to the sides of the slideway for lubrication purposes.

34. A lathe designed to cut the surface of a work piece and comprising a supporting structure, a power driven chuck positioned over the structure and adapted to support one end of and drive the work piece, means mounted on the structure in opposed relation with the chuck for releasably supporting the other end of the work piece, a housing adjacent the releasable supporting means, mounted on the structure and provided with a horizontal cylinder with one end thereof open and facing in the direction of the chuck and its other end closed, and also provided with means forming a horizontal slot type slideway in communication with, and extending lengthwise of, the upper central portion of the cylinder, a plunger having one end thereof slidably mounted in the cylinder and its other end provided with a cutting tool, and adapted when slid outwards in the direction of the chuck to have the tool traverse the work piece and effect cutting thereof, a pump for delivering fluid under pressure into the inner end of the cylinder to force the plunger towards the chuck, means including a valve for venting the inner end of the cylinder, means for retracting the plunger when said inner end of the cylinder is vented as a result of opening of the valve, a slide block connected to the central portion of the plunger and mounted to slide in the slideway and coact therewith to prevent turning of the plunger, and means for supplying oil from the inner end of the cylinder to the sides of the slide block and to the sides of the slideway for lubricating purposes including a longitudinal duct in the plunger and a passage in the slide block in communication with the duct.

35. A lathe designed to cut the surface of a work piece and comprising a supporting structure, a power driven chuck positioned over the structure and adapted to support one end of and drive the work piece, a housing mounted on the supporting structure in opposed relation with the chuck and having substantial alignment with the chuck, a cylinder type socket with the end thereof nearer the chuck open and its other end closed, a centering pin slidably mounted in the socket and adapted when slid outwards to engage and support the other end of the work piece, means for supplying fluid under pressure to the socket in order to effect outward sliding of the pin into its work piece supporting position, means for venting the socket including a valve, means for retracting the centering pin upon opening of the valve, a cylinder on the supporting structure disposed at one side of, and in substantially parallel relation with, the socket and having the end thereof nearer the chuck open and its other end closed, a plunger having one end thereof slidably mounted in the cylinder and its other end provided with a cutting tool and adapted when slid outwards in the direction of the chuck to have the tool traverse the work piece and effect cutting thereof, means for delivering fluid under pressure into the cylinder to cause the plunger to slide outwards, means including a valve for venting the cylinder, means for retracting the plunger upon opening of the last mentioned valve, means for automatically opening the two valves when the plunger reaches the end of its cutting stroke, and means for camming the other end of the work piece away from the plunger immediately upon retraction of the centering pin due to the opening of the first mentioned valve at the conclusion of the cutting stroke of the plunger.

36. A lathe designed to cut the surface of a work piece and comprising a supporting structure, a power driven chuck positioned over the structure and adapted to support one end of and drive the work piece, a housing mounted on the supporting structure in opposed relation with the chuck and having substantial alignment with the chuck, a cylinder type socket with the end thereof nearer the chuck open and its other end closed, a centering pin slidably mounted in the socket and adapted when slid outwards to engage and support the other end of the work piece, means for supplying fluid under pressure to the socket in order to effect outward sliding of the pin into its work piece supporting position, means for venting the socket including a valve, means for retracting the centering pin upon opening of the valve, a cylinder on the supporting structure disposed at one side of, and in substantially parallel relation with, the socket and having the end thereof nearer the chuck open and its other end closed, a plunger having one end thereof slidably mounted in the cylinder and its other end provided with a cutting tool and adapted when slid outwards in the direction of the chuck to have the tool traverse the work piece and effect cutting thereof, means for delivering fluid under pressure into the cylinder to cause the plunger to slide outwards, means including a valve for venting the cylinder, means for retracting the plunger upon opening of the last mentioned valve, means for automatically opening the two valves when the plunger reaches the end of its cutting stroke, and means comprising a notched plate beneath the centering pin for camming the other end of the work piece away from the plunger immediately upon retraction of the centering pin due to the opening of the first mentioned valve at the conclusion of the cutting stroke of the plunger.

GARNET W. McKEE.